(12) United States Patent
Stoddart et al.

(10) Patent No.: US 11,267,939 B2
(45) Date of Patent: Mar. 8, 2022

(54) TRÖGER'S BASE-LINKED POLY(CROWN ETHERS)S

(71) Applicants: NORTHWESTERN UNIVERSITY, Evanston, IL (US); KING ABDULAZIZ CITY FOR SCIENCE AND TECHNOLOGY (KACST), Riyadh (SA)

(72) Inventors: James Fraser Stoddart, Evanston, IL (US); Hasmukh A. Patel, Evanston, IL (US)

(73) Assignees: Northwestern University, Evanston, IL (US); King Abdulaziz City for Science and Technology (KACST), Riyadh (SA)

( * ) Notice: Subject to any disclaimer, the term of this patent is extended or adjusted under 35 U.S.C. 154(b) by 120 days.

(21) Appl. No.: 16/760,763

(22) PCT Filed: Nov. 2, 2018

(86) PCT No.: PCT/US2018/059046
§ 371 (c)(1),
(2) Date: Apr. 30, 2020

(87) PCT Pub. No.: WO2019/090140
PCT Pub. Date: May 9, 2019

(65) Prior Publication Data
US 2020/0277441 A1    Sep. 3, 2020

Related U.S. Application Data

(60) Provisional application No. 62/580,860, filed on Nov. 2, 2017.

(51) Int. Cl.
*H01M 8/04* (2016.01)
*C07C 41/00* (2006.01)
(Continued)

(52) U.S. Cl.
CPC ......... *C08G 73/0694* (2013.01); *C08G 75/23* (2013.01); *C08J 5/2256* (2013.01); *H01M 8/1004* (2013.01); *H01M 2008/1095* (2013.01)

(58) Field of Classification Search
CPC ..................................................... H01M 4/02
See application file for complete search history.

(56) References Cited

U.S. PATENT DOCUMENTS

2005/0065304 A1    3/2005    Asakawa

OTHER PUBLICATIONS

Zolotukhin ("Film-Forming Polymers Containing in the Main-Chain Dibenzo Crown Ethers with Aliphatic (C10—C16), Aliphatic-Aromatic, or Oxyindole Spacers" Macromolecules 2006, 39, 4696-4703).*

(Continued)

*Primary Examiner* — Jacob B Marks
(74) *Attorney, Agent, or Firm* — Quarles & Brady LLP

(57) ABSTRACT

Described herein are double-strand chain compositions suitable for use in the preparation of proton conductive membranes. The double-strand chains comprise a plurality of constitutional units joined to each other through two atoms on one side of the constitutional unit and two atoms on the other side of the constitutional unit. Constitutional units comprise a dibenzo-crown ether macrocycle fused with a bicyclic aliphatic linker. Polymers, membranes, and fuel cells comprising the double-strand chain are also described herein.

20 Claims, 20 Drawing Sheets

(51) Int. Cl.
C08G 73/06 (2006.01)
C08G 75/23 (2006.01)
C08J 5/22 (2006.01)
H01M 8/1004 (2016.01)
H01M 8/10 (2016.01)

(56) References Cited

OTHER PUBLICATIONS

Wiktorowicz, S., et al. "Multi-stimuli responsive poly (azodibenzo-18-crown-6-ether) s." Polymer Chemistry 5.16 (2014): 4693-4700.
Wünsche, J., et al. (2015). Protonic and electronic transport in hydrated thin films of the pigment eumelanin. Chem. Mater. 27, 436-442.
Yamada, T. et al. Proton-Conductive Metal-Organic Frameworks. Bull. Chem. Soc. Jpn. 2016, 89, 1-10.
Ye, Y.; et al. High anhydrous proton conductivity of imidazole-loaded mesoporous polyimides over a wide range from subzero to moderate temperature. J. Am. Chem. Soc. 2015, 137, 913-918.
Yoon, M. et al. High and highly anisotropic proton conductivity in organic molecular porous materials. Angew. Chem. Int. Ed. 2011, 50, 7870-7873.
Yoon, M., et al. (2013). Proton conduction in metal-organic frameworks and related modularly built porous solids. Angew. Chem. Int. Ed. 52, 2688-2700.
Zhang, H. W., et al. (2012). Recent development of polymer electrolyte membranes for fuel cells. Chem. Rev. 112, 2780-2832.
Bae, Y. S., et al. (2011). Development and evaluation of porous materials for carbon dioxide separation and capture. Angew. Chem. Int. Ed. 50, 11586-11596.
Bisbey, R. P. et al. Covalent Organic Frameworks as a Platform for Multidimensional Polymerization. ACS Cent. Sci. 2017, 3, 533-543.
Bühl, M., et al. (2002). Hydronium ion complex of 18-crown-6:? Where are the protons? A density functional study of static and dynamic properties. J. Am. Chem. Soc. 124, 4473-4480.
Buhl, M., et al. (2004). Hydronium ion complex of 18-crown-6: Theory confirms three "normal" linear hydrogen bonds. J. Phys. Chem. A 108, 11463-11468.
Bureekaew, S., et al. (2009). One-dimensional imidazole aggregate in aluminium porous coordination polymers with high proton conductivity. Nat. Mater. 8, 831-836.
Byun, J., et al. (2014). Nanoporous covalent organic polymers incorporating Tröger's base functionalities for enhanced CO2 capture. J. Mater. Chem. A 2, 12507-12512.
Carta, M., et al. (2013). An efficient polymer molecular sieve for membrane gas separations. Science 339, 303-307.
Chakraborty, C.; et al. One-dimensional anhydrous proton conducting channel formation at high temperature in a Pt(II)-based metallosupramolecular polymer and imidazole system. ACS Appl. Mater. Inter. 2017, 9 (15), 13406-13414.
Chen, Y. et al. Enhancement of anhydrous proton transport by supramolecular nanochannels in comb polymers. Nat. Chem. 2010, 2, 503-508.
Cooper, A. I. Porous Molecular Solids and Liquids. ACS Cent. Sci. 2017, 3, 544-553.
Deetz, M. J., et al. (2000). A macrobicyclic receptor with versatile recognition properties: Simultaneous binding of an ion pair and selective complexation of dimethylsulfoxide. J. Am. Chem. Soc. 122, 6201-6207.
Deng, Y., et al. (2013). H+-type and OH--type biological protonic semiconductors and complementary devices. Sci. Rep. 3, 2481.
Devanathan, R. (2008). Recent developments in proton exchange membranes for fuel cells. Energy Environ. Sci. 1, 101-119.
Didier, D., et al. (2008). Functionalized analogues of Tröger's base: scope and limitations of a general synthetic procedure and facile, predictable method for the separation of enantiomers. Tetrahedron 64, 6252-6262.

Dolensky, B., et al. (2005). Synthetic routes to linear oligo-Tröger's bases. Org. Lett. 7, 67-70.
Dolensky, B., et al. (2012). Oligo Tröger's bases—new molecular scaffolds. Chem. Soc. Rev. 41, 3839-3858.
Fromm, K. M., et al. (2007). Transport properties of solid state crown ether channel systems. Solid State Sci. 9, 580-587.
Fukuhara, K., et al. (1995). Raman spectroscopic study of the hydrates of 18-crown-6. J. Phys. Chem. A 99, 8617-8623.
Gokel, G. W., et al. (2004). Crown ethers: sensors for ions and molecular scaffolds for materials and biological models. Chem. Rev. 104, 2723-2750.
Han, T., et al. "A triptycene-based bis (crown ether) host: Complexation with both paraquat derivatives and dibenzylammonium salts." Organic letters 8.6 (2006): 1069-1072.
Hansson, A. P., et al. "A bis (crown-ether) analogue of Tröger's base: Recognition of achiral and chiral primary bisammonium salts." Tetrahedron letters 39.25 (1998): 4565-4568.
Hansson, A., et al. (2005). A desymmetrization route to fused Troger's base analogues: Synthesis, isolation, and characterization of the first anti-anti diastereomer of a fused tris-Tröger's base analogue. Org. Lett. 7, 2019-2022.
Hemmatian, Z., et al. (2016). Electronic control of H+ current in a bioprotonic device with Gramicidin A and Alamethicin. Nat. Commun. 7, 12981.
Horike, S.; et al. Coordination networkbased ionic plastic crystal for anhydrous proton conductivity. J. Am. Chem. Soc. 2012, 134, 7612-7615.
Hsueh, S-Y, et al. "Highly selective Na (+)-templated formation of [2] pseudorotaxanes exhibiting significant optical outputs." Angewandte Chemie (International ed. in English) 46.12 (2007): 2013-2017.
Hurd, J. A. et al. (2009). Anhydrous proton conduction at 150° C. in a crystalline metal-organic framework. Nat. Chem. 1, 705-710.
International Searching Authority. International Search Report and Written Opinion for application PCT/US2018/059046, dated Jan. 22, 2019. 8 pages.
Jiang, W., et al. "A double plug-socket system capable of molecular keypad locks through controllable photooxidation." Chemistry—A European Journal 15.38 (2009): 9938-9945.
Josberger, E. E., et al. (2016). Proton conductivity in ampullae of Lorenzini jelly. Sci. Adv. 2, e1600112.
Kraytsberg, A., et al. (2014). Review of advanced materials for proton exchange membrane fuel cells. Energy Fuel 28, 7303-7330.
Kreuer, K. D. On the development of proton conducting polymer membranes for hydrogen and methanol fuel cells. J. Membr. Sci. 2001, 185, 29-39.
Kriz, J., et al. (2008). Interaction of hydronium ion with dibenzo-18-crown-6: NMR, IR, and theoretical study. J. Phys. Chem. A 112, 10236-10243.
Kusaka, R., et al. (2009). Water-mediated conformer optimization in benzo-18-crown-6-ether/water system. Phys. Chem. Chem. Phys. 11, 9132-9140.
Liu, Z., et al. (2017). Surveying macrocyclic chemistry: from flexible crown ethers to rigid cyclophanes. Chem. Soc. Rev. 46, 2459-2478.
Miyake, T. et al. Grotthuss mechanisms: From proton transport in proton wires to bioprotonic devices. J. Phys.: Condens. Matter 2016, 28, 023001.
Montoro, C. et al. Ionic conductivity and potential application for fuel cell of a modified imine-based covalent organic framework. J. Am. Chem. Soc. 2017, 139(29), 10079-10086.
Pandey, R. K.; et al. Proton conduction in Mo(VI)-based metallosupramolecular polymers. Chem. Commun. 2015, 51, 11012-11014.
Patel, H. A., et al. "Proton Conduction in Troger's Base-Linked Poly (crown ether) s." ACS applied materials & interfaces 10.30 (2018): 25303-25310.
Patel, H. A., et al. (2016). Superacidity in Nafion/MOF hybrid membranes retains water at low humidity to enhance proton conduction for fuel cells. ACS Appl. Mater. Inter. 8, 30687-30691.
Patel, H. A., et al. (2017). Carbon dioxide capture adsorbents: Chemistry and methods. ChemSusChem 10, 1303-1317.
Pedersen, C. J. (1967). Cyclic polyethers and their complexes with metal salts. J. Am. Chem. Soc. 89, 2495-2496.

(56) References Cited

OTHER PUBLICATIONS

Rúnarsson, ÖV et al. "The 125th anniversary of the Tröger's base molecule: synthesis and applications of Tröger's base analogues." European Journal of Organic Chemistry 2012.36 (2012): 7015-7041.

Scofield, M. E., et al. (2015). A concise guide to sustainable PEMFCs: recent advances in improving both oxygen reduction catalysts and proton exchange membranes. Chem. Soc. Rev. 44, 5836-5860.

Shchori, E., et al. (1973). Kinetics of complexation of macrocyclic polyethers with sodium ions by nuclear magnetic resonance spectroscopy .II. Solvent effects. J. Am. Chem. Soc. 95, 3842-3846.

Shin, D. W., et al. (2017). Hydrocarbon-based polymer electrolyte membranes: Importance of morphology on ion transport and membrane stability. Chem. Rev. 117, 4759-4805.

Taylor, J. M., et al. (2010). Facile proton conduction via ordered water molecules in a phosphonate metal-organic framework. J. Am. Chem. Soc. 132, 14055-14057.

Trickett, C. A., et al. (2017). The chemistry of metal-organic frameworks for CO2 capture, regeneration and conversion. Nat. Rev. Mater. 2, 17045.

Tripathi, B. P., et al. (2011). Organic-inorganic nanocomposite polymer electrolyte membranes for fuel cell applications. Prog. Polym. Sci. 36, 945-979.

Umeyama, D., et al. (2012). Inherent proton conduction in a 2D coordination framework. J. Am. Chem. Soc. 134, 12780-12785.

Wang, H., et al. (2017). Metal-organic frameworks for energy applications. Chem 2, 52-80.

\* cited by examiner

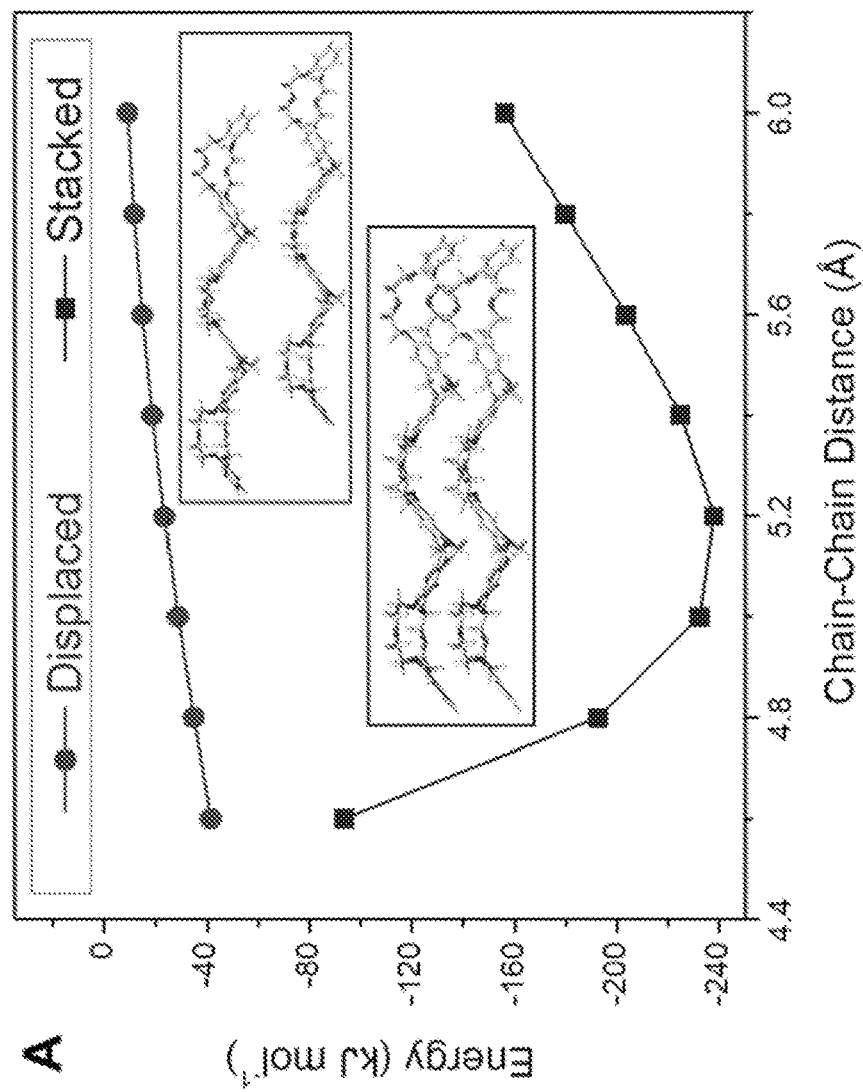
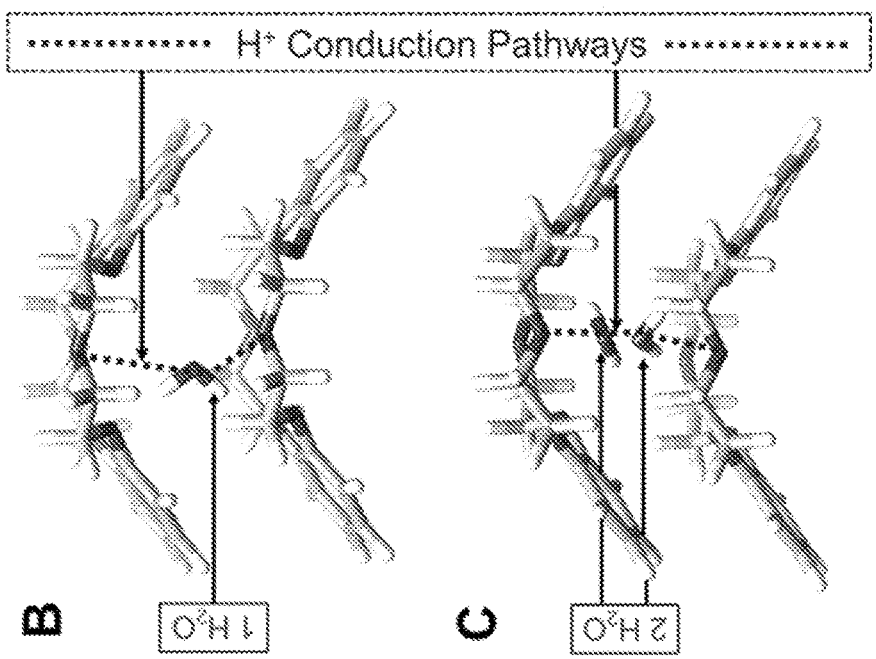
Fig. 11A  Fig. 11B  Fig. 11C

TRÖGER'S BASE-LINKED POLY(CROWN ETHERS)S

CROSS-REFERENCE TO RELATED APPLICATIONS

This application is a national stage filing under 35 U.S.C. § 371 of International Patent Application No. PCT/US2018/059046, filed Nov. 2, 2018, which claims benefit of priority to U.S. Provisional Application No. 62/580,860, filed 2 Nov. 2017, the content of each are incorporated herein by reference in their entirety.

FIELD OF INVENTION

The technology generally relates to compositions comprising poly(crown ethers)s. More particularly, the technology relates to double-strand chain, polymer, and membrane compositions comprising a plurality of constitutional units comprising a dibenzo-crown ether macrocycle fused with a bicyclic aliphatic linker.

BACKGROUND

Since the invention of the first proton exchange membrane fuel cells (PEMFCs) in the mid-1960s, researchers have been devoting effort towards developing a significant component of PEMFCs, i.e, proton exchange membranes (PEMs). Nonetheless, there are few noteworthy PEMs, e.g., perfluorosulfonic acid ionomers (Nafion), sulfonated and phosphonic-based polyaromatics (polyphenylsulfone, poly (ether ether ketone), polyimides, polystyrene), polyphosphazenes, polybenzimidazoles, and their derivatives. As a result, there exists a need for new PEM materials.

BRIEF SUMMARY OF THE INVENTION

Described herein are double-strand chain compositions suitable for use in the preparation of proton conductive membranes. The double-strand chains comprise a plurality of constitutional units joined to each other through two atoms on one side of the constitutional unit and two atoms on the other side of the constitutional unit. Constitutional units comprise a dibenzo-crown ether macrocycle fused with a bicyclic aliphatic linker. The aliphatic linker may comprise a diazocine linker having two bridgehead nitrogen atoms, suitably a [b,f][1,5]diazocine linker bridged by a methylene. The dibenzo-crown ether macrocycle may comprise a dibenzo[n]crown-m macrocycle and m=4, 5, 6, 7, or 8 and n=3 m. In certain embodiments, m=6. The double-strand chain compositions may be prepared from the cyclopolymerization of a plurality of di(aminobenzo)crown ethers. Suitably, the di(aminobenzo)crown ethers may be selected from the group consisting of Formula IA

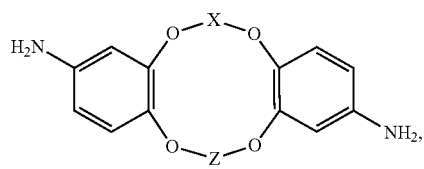

(IA)

Formula IB

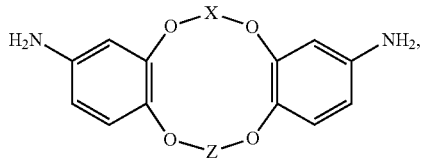

(IB)

and any combination thereof. X and Z may be selected from the group consisting of alkyl and ether. In some embodiments, X and Y are independently selected from —CH$_2$CH$_2$—, CH$_2$CH$_2$OCH$_2$CH$_2$—, or —CH$_2$CH$_2$OCH$_2$CH$_2$OCH$_2$CH$_2$—.

Polymers are also provided for. The polymer may comprise any of the double-strand chains described herein. Suitably, the polymer has a weight-average molecular weight ($M_w$) of at least 100,000 Da; the polymer is thermally stable in an inert atmosphere up to a temperature of at least 200° C.; the polymer is at least partially soluble in a halogenated alkane solvent; the polymer has a water uptake capacity of at least 10 wt % at 90% relative humidity; the polymer is capable of forming films; or any combination thereof.

Membranes are also provided for. The membrane may comprise any of the double-strand chains or polymers described herein. Suitably, the membrane is proton conductive; capable of binding ions or small molecules; is capable of separating gases; is capable of treating water; or any combination thereof. In some embodiments, the membrane is a proton exchange membrane. The membrane may have a proton conductivity of at least $1.0 \times 10^{-8}$ S cm$^{-1}$.

Proton exchange membrane fuel cells are also provided for. The proton exchange membrane fuel cells may comprise any of the membranes described herein.

Methods of preparing the proton conductive membranes are also provided for. The method comprises providing any of the double-strand chains described herein or a polymer comprising any of the double-strand chains described herein and forming a membrane. The method may further comprise absorbing water onto the membrane. The double strand chain may be prepared from cyclopolymerization of a plurality of di(aminobenzo)crown ethers. Suitably, the di(aminobenzo)crown ethers may be selected from the group consisting of Formula IA

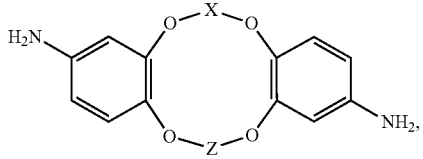

(IA)

Formula IB

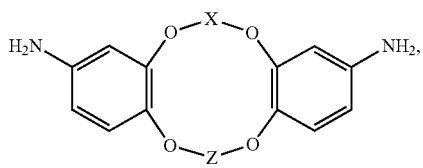

(IB)

and any combination thereof. X and Z may be selected from the group consisting of alkyl and ether. In some embodiments, X and Y are independently selected from —CH$_2$CH$_2$—, —CH$_2$CH$_2$OCH$_2$CH$_2$—, or —CH$_2$CH$_2$OCH$_2$CH$_2$OCH$_2$CH$_2$—. In some embodiments, the membrane is formed by solution casting.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 8A illustrates the behavior of palladium hydride (PdH$_x$) protode behavior. PdH contacts split into Pd, H+, and e under an applied voltage. Protons are injected into the polymer and electrons travel through the external circuit. FIG. 8B illustrates the geometry of a transmission line measurement (TLM). Bulk and contact resistances can be separated by changing the distance between the source and the drain (L$_{SD}$). FIG. 8C illustrates the calculated conductivity from transient current responses to a 1 V potential applied to poly(TBL-DB[18]C-6)-t under 50, 75 and 90% relative humidities with 5% H$_2$ gas. The data curves appear in the following order from top to bottom on the left side of the graph: 90% RH with 5% H$_2$, 90% RH, 75% RH, then 50% RH. FIG. 8D illustrates the calculated conductivity from transient current responses to a 1 V potential displaying a kinetic isotope effect. Deuterium conductivity is half as much as proton conductivity. The data curves appear in the following order from top to bottom on the left side of the graph: 90% RH with 5% H$_2$, then 90% RH with 5% D$_2$. FIG. 8E illustrates resistance (R$_L$) against L$_{SD}$ plot for poly(TBL-DB18C6)-t and the calculated conductivity—from the slope obtained from a linear fit of resistance—yields a value of 1.4×10$^{-4}$ mS cm$^{-1}$. FIG. 8F illustrates the calculated conductivity from transient current responses to a 1 V potential applied to poly(TBL-DB[18]C) under 50, 75 and 90% relative humidities with 5% H2 gas. The data curves appear in the following order from top to bottom on the left side of the graph: 90% RH with 5% H$_2$, 90% RH, 75% RH, then 50% RH. FIG. 8G illustrates resistance (RL) against LSD plot for poly(TBL-DB18C6)-c and the calculated conductivity—from the slope obtained from a linear fit of resistance—yields a value of 1.1×10-4 mS cm$^{-1}$.

In FIG. 10A, the data curves appear in the following order form top to bottom on the left side of the graph: 90% RH+H$_2$ (Pd), 90% RH+H$_2$ (Au), then 90% RH. In FIG. 10B, the data curves appear in the following order form top to bottom on the left side of the graph: 90% RH+H$_2$ (Au), 90% RH+H$_2$ (Pd), then 90% RH.

FIGS. 11A-11C illustrates modeling Studies Conducted on Representative Short Polymer Chains of Poly(TBL- DB18C6)-t. FIG. 11A shows a potential energy surface of the double layer in stacked and displaced forms, computed at B97D3/6-31G(d) level with the geometry of each layer kept fixed during the scan. FIGS. 11B and 11C illustrate optimized structures of double layer DB18C6 with (FIG. 11B) one H$_2$O molecule and (FIG. 11C) two H$_2$O molecules between the layers forming H$^+$-conduction pathways through the formation of hydrogen-bonds between H$_2$O molecules and oxygen atoms in the crown ether cavities. Geometries were optimized at B3LYP/6-31G(d,p) level with layers kept fixed at a distance of 5.2 Å in the stacked form.

DETAILED DESCRIPTION OF THE INVENTION

Figure 1:
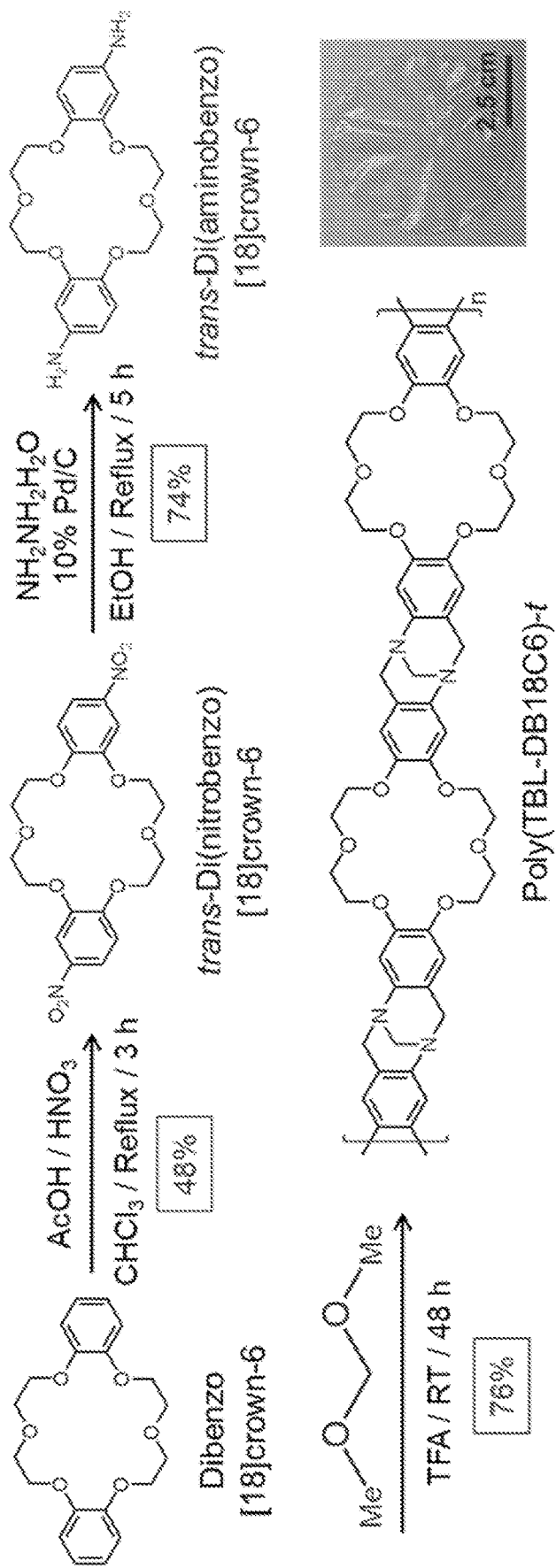
FIG. 1 illustrates the Synthesis of trans-Di(nitrobenzo)[18]crown-6, trans-Di(aminobenzo)[18]crown-6, and Poly(TBL-DB18C6)-t. A film (inset) was obtained by the slow evaporation of a solution of poly(TBL-DB18C6)-t (200 mg) in CHCl$_3$ (10 mL) from a Petri dish at room temperature overnight, followed by drying at 80° C. for 5 h. The dried film in the Petri dish was soaked in de-ionized water for 1 h and peeled off to obtain a free-standing membrane.

Disclosed herein are double-strand chains and polymers comprising crown ether moieties. These polymers are robust, processable, hydrophilic, and have a high molecular weight. These hydrophilic polymers retain H$_2$O and facilitate proton conduction in humid environments. As a result, these polymers are a new class of proton exchange membranes (PEMs), expanding the ever-growing need to identify new materials for proton exchange membrane fuel cells (PEMFCs) in order to enhance proton conductivity. The sub-nanometer-sized crown cavities and the membrane-forming ability of the polymers will also allow for a number of different applications, including, but not limited to, ion binding, small molecule binding, gas separation, and/or water treatment.

PEMFCs are one of the best alternatives to the combustion of fossil fuels as a result of their efficiency in transforming chemical into electrical energy by means of a clean and carbon-free route. The redox reaction of hydrogen (H$_2$) and oxygen (O$_2$) generates water (H$_2$O), heat and electricity in PEMFCs. In the fuel cell, the oxidized protons from the anode are transported through the electrolytic membrane to the cathode where they react with reduced oxygen.

PEMs are key components of PEMFCs. The PEMs act as an electrolyte to facilitate ionic pathways for the protons from the anode. Currently, available PEM materials include perfluorosulfonic acid ionomers sulfonated and phosphonic-based polyaromatics (polyphenylsulfone, poly(ether ether ketone), polyimides, polystyrene), polyphosphazenes, polybenzimidazoles, and their derivatives. The state-of-the-art material for PEMs is Nafion since it displays proton conductivity of $10^{-1}$ S cm$^{-1}$ under conditions of 100% relative humidity at room temperature. The limited number of alternative PEMs has led to researchers modifying the existing families of polymeric materials. The double-strand chains and polymers disclosed herein, however, provide an entirely new class of materials that can be prepared into PEMs for PEMFCs.

PEMs have to fulfill three major requirements in order to be considered for applications in PEMFCs: they include (i) the presence of proton-conducting functionalities, (ii) the ability to form free-standing films to support the conductivity, and (iii) the need for robust, thermal and aqueous acid stabilities. We address these requirements with the Tröger's base-linked double-strand chains and polymers obtained by in situ polymerization of amino-functionalized crown macrocycles, which are described herein.

The double-strand chains and polymers described herein may be prepared from dibenzo-crown macrocycles. A "crown" is a molecular entity comprising a monocyclic ligand assembly that contains three or more binding sites held together by covalent bonds and capable of binding a guest in a central (or nearly central) position. The adducts formed are sometimes known as "coronates". Crown macrocycles may be described as "[n]crown-m macrocycles" or "nCm", where m is a number of repeating units and n is the total number of atoms forming the macrocycle. Suitably m is equal to 4, 5, 6, 7, or 8, but larger macrocycles may also be prepared. Because crowns are typically formed from repeating units, n is usually an integer multiple of m. Suitably, n is equal to 3 m.

Members of this group include macrocyclic polyethers (also known as "crown ethers"). Crown ethers comprise m repeating units of —CR$_2$CR$_2$O— forming the macrocycle. An exemplary crown ether is [18]crown-6 (18C6), comprising 6 repeating units of —CR$_2$CR$_2$O— and forming the macrocycle having 18 total atoms and 6 oxygen atoms. The radical R is often hydrogen, but need not be. Suitably one or more of the repeating units of the crown ether may be optionally substituted or fused with another ring structure.

The Tröger's base-linked chains or polymers may be synthesized by polymerization of di(aminobenzo)-crowns. As shown in the Examples that follow, dibenzo-crowns or DBnCm are capable of reacting to form di(nitrobenzo)-crowns and further di(aminobenzo)-crowns. For example, DB18C6 may be reacted with nitric acid to form two constitutional isomers, namely trans- and cis-di(nitrobenzo)[18]crown-6. Further, these isomers may be reduced affording trans- and cis-di(aminobenzo)[18] crown-6, respectively.

Exemplary di(aminobenzo)-crowns suitable for use with the present invention include a compound of Formula IA

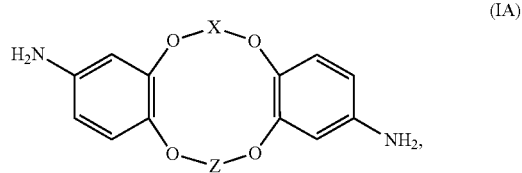

(IA)

which is referred to as "trans-di(aminobenzo)-crown", or a compound of

Formula IB

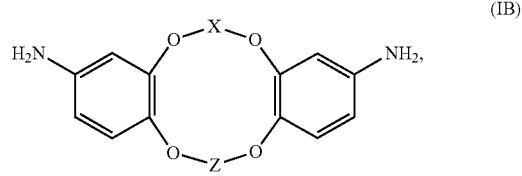

(IB)

which is referred to as "cis-di(aminobenzo)-crown", and combinations thereof. Other di(aminobenzo)-crown ethers may also be used to prepare the compositions of the present invention, including di(aminobenzo)-crowns having amino groups on any of the aryl carbons that are not fused with the crown moiety, substituted-aryl di(aminobenzo)-crowns, and/or crown-substituted di(aminobenzo)-crowns. Substituents on the aryl moiety of the substituted-aryl di(aminobenzo)-crowns may include electron-donating or -withdrawing substituents. Suitably, electron-donating substituents may include halo, alkyl, haloalkyl, alkoxy, amino, sulfanyl, or alkoxycarbonyl.

In some embodiments, the crown is a crown ether. Suitable moieties X and Z for crown ethers include alkyl and/or ether moieties. The term "alkyl", when used in reference to the crown, may be used synonymously with aklylene and includes a substituted or unsubstituted $C_2$-$C_6$ alkyl diradical in all of its isomeric forms, including a $C_2$-$C_4$ alkyl diradical, or $C_2$ alkyl diradical such as a substituted or unsubstituted ethylene. The term "ether", when used in reference to the crown, includes two or more $C_2$-$C_6$ alkyl diradicals covalently linked by oxygen atoms, including two or more $C_2$-$C_4$ alkyl diradicals covalently linked by oxygen atoms or two or more $C_2$ alkyl diradicals, such as a substituted or unsubstituted ethylenes, covalently linked by oxygen atoms.

In some embodiments, X may be —$CH_2CH_2$—, —$CH_2CH_2OCH_2CH_2$—, or —$CH_2CH_2OCH_2CH_2OCH_2CH_2$—. In certain embodiments, X is-$CH_2CH_2OCH_2CH_2$—. In some embodiments, Z is selected from —$CH_2CH_2$—, —$CH_2CH_2OCH_2CH_2$—, or $CH_2CH_2OCH_2CH_2OCH_2CH_2$—. In certain embodiments, Z is-$CH_2CH_2OCH_2CH_2$—. In some embodiments, X and Z are the same.

In certain embodiments, X is —$CH_2CH_2$— and Z is —$CH_2CH_2$—, resulting in a 12-crown-4 (12C4) crown ether moiety. In some embodiments, X is —$CH_2CH_2$— and Z is —$CH_2CH_2OCH_2CH_2$—, resulting in a 15-crown-5 (15C5) crown ether moiety. In some embodiments, X is —$CH_2CH_2$— and Z is —$CH_2CH_2OCH_2CH_2OCH_2CH_2$—, resulting in an 18-crown-6 (18C6) crown ether moiety. In some embodiments, X is —$CH_2CH_2OCH_2CH_2$— and Z is —$CH_2CH_2$—, resulting in a 15-crown-5 (15C5) crown ether moiety. In some embodiments, X is —$CH_2CH_2OCH_2CH_2$— and Z is —$CH_2CH_2OCH_2CH_2$—, resulting in an 18-crown-6 (18C6) crown ether moiety. In some embodiments, X is —$CH_2CH_2OCH_2CH_2$— and Z is —$CH_2CH_2OCH_2CH_2OCH_2CH_2$—, resulting in a 21-crown-7 (21C7) crown ether moiety. In some embodiments, X is —$CH_2CH_2OCH_2CH_2OCH_2CH_2$— and Z is —$CH_2CH_2$—, resulting in an 18-crown-6 (18C6) crown ether moiety. In some embodiments, X is $CH_2CH_2OCH_2CH_2OCH_2CH_2$— and Z is —$CH_2CH_2OCH_2CH_2$—, resulting in a 21-crown-7 (21C7) crown ether moiety. In some embodiments, X is —$CH_2CH_2OCH_2CH_2OCH_2CH_2$— and Z is —$CH_2CH_2OCH_2CH_2OCH_2CH_2$—, resulting in a 24-crown-8 (24C8) crown ether moiety.

Tröger's Base (TB) condensation results in the formation of a bicyclic aliphatic linker via cyclopolymerization. TB condensation is illustrated in the following example: p-toluidine reacts in the presence of a synthetic equivalent of methylene under acidic conditions to form a diazocine linker having two bridgehead nitrogen atoms.

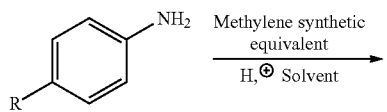

-continued

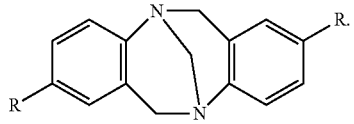

The synthetic equivalent of methylene may be any suitable reactant, including, without limitation, formaldehyde or a precursor, such as methylal, paraformaldehyde, or hexamethylenetetramine. The acidic conditions are typically aqueous or alcoholic HCl solutions, acetic acid, trifluoroacetic acid (TFA), or methanesulfonic acid. The resulting linker comprises [b,f][1,5]diazocine bridged by a methylene that is fused with an aryl ring of the dibenzo-crown.

Because each of the aryl moieties of the di(aminobenzo)-crowns possess a reactive amine group, double-strand chains may be prepared from constitutional units comprising the dibenzo-crown macrocycles fused with bicyclic aliphatic linkers. The chains produced via cyclopolymerization lack an ordered structure. This is a result of the fact that the chains may be comprised of a multiplicity of different strereoisomers and/or structural isomers of the constitutional unit. For an example of stereoisomerism, the relative configurations, syn and anti, defined by the bridging methylene groups of the bicyclic aliphatic linker may be arranged randomly along the chain. For an example of structural isomerism, either of the carbon-carbon bonds adjacent to the TB reactive amine may be fused to the aliphatic linker resulting in linear constitutional units and non-linear constitutional units. "Linear constitutional units" comprise a carbon-carbon bond fusing the dibenzo-crown and bicyclic aliphatic linker at carbon positions 4 and 5 of the aryl ring, e.g.,

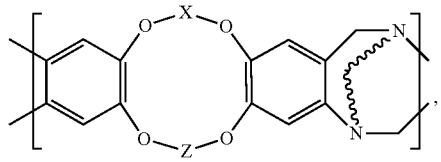

as shown in Scheme 3. "Non-linear constitutional units" comprise a carbon-carbon bond fusing the dibenzo-crown and bicyclic aliphatic linker at carbon positions 3 and 4 of the aryl ring, e.g.,

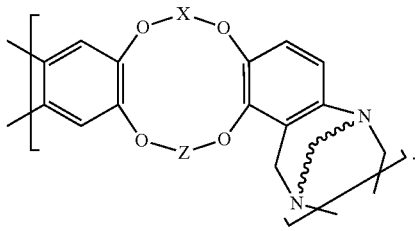

Polymers may be prepared from any of the double-strand chains described herein. Polymers of the present invention have a number of advantages advantageous such as being robust, processable, hydrophilic, and have a high molecular weight. In some embodiments, the polymers have a weight-average molecular weight ($M_w$) of at least 100,000 Da. Suitably the $M_w$ is at least 200,000 Da, 300,000 Da, 400,000

Da, 500,000 Da, or 600,000 Da. In some embodiments, the polymers are thermally stable in an inert atmosphere up to a temperature of at least 200° C. Suitably, the polymers are thermally stable in an inert atmosphere up to a temperature of at least 225° C., 250° C., 275° C., 300° C., 325° C., or 350° C. In some embodiments, the polymers are at least partially soluble in a halogenated alkane solvent. Suitable halogenated alkane solvents include, without limitation, haloforms such as chloroform. In some embodiments, the polymers have a water uptake capacity of at least 10 wt % at 90% relative humidity. Suitably, the polymers have a water uptake capacity of at least 15 wt % or 20 wt % at 90% relative humidity. In some embodiments, the polymers are capable of forming films or membranes. In certain embodiments, the polymers possess at least two of the properties described above. In particular embodiments, the polymers possess all of the properties described above.

Membranes may be prepared from the polymers and double strand chains described herein. Membranes of the present invention have a number of advantageous properties, including, without limitation, capable of being proton conductive, capable of binding ions or small molecules, capable of separating gases, or capable of sequestering pollutants from water for treatment. In certain embodiments, the membranes possess at least two of the properties described above. In particular embodiments, the membranes possess all of the properties described above.

Membranes prepared from the polymer and double strand chain composition of the present invention include proton exchange membranes. "Proton exchange membranes" or "PEMs" are semipermeable membrane capable of conducting protons while acting as an electrical insulator and reactant barrier. Suitably the membranes described herein have a proton conductivity of at least $1.0 \times 10^{-8}$ S cm$^{-1}$, $1.1 \times 10^{-8}$ S cm$^{-1}$, $1.2 \times 10^{-8}$ S cm$^{-1}$, $1.3 \times 10^{-8}$ S cm$^{-1}$, $1.4 \times 10^{-8}$ S cm$^{-1}$, $1.5 \times 10^{-8}$ S cm$^{-1}$, $1.6 \times 10^{-8}$ S cm$^{-1}$, $1.7 \times 10^{-8}$ S cm$^{-1}$, $1.8 \times 10^{-8}$ S cm$^{-1}$, $1.9 \times 10^{-8}$ S cm$^{-1}$, $1.0 \times 10^{-7}$ S cm$^{-1}$, $1.1 \times 10^{-7}$ S cm$^{-1}$, $1.2 \times 10^{-7}$ S cm$^{-1}$, $1.3 \times 10^{-7}$ S cm$^{-1}$, or $1.4 \times 10^{-7}$ S cm$^{-1}$.

PEMs may be used in the construction of proton exchange membrane fuel cells. "Proton exchange membrane fuel cells" or "PEMFCs" are a type of fuel cell comprising PEMs that transforms chemical energy liberated during the electrochemical reaction of hydrogen and oxygen to electrical energy. PEMFCs comprise membrane electron assemblies. "membrane electron assemblies" or "MEAs" comprises an assembled stack of a PEM between two electrodes where the PEM allows for the migration of protons from one electrode to the other while also electrically and chemically insulating the electrodes and associated reactions from each other. Typically the reaction at the anode is $H_2 \rightarrow 2 H^+ + 2 e^-$ and the reaction of the cathode is $\frac{1}{2} O_2 + 2 H^+ + 2 e^- \rightarrow H_2O$, resulting in a net reaction of $H_2 + \frac{1}{2}O_2 \rightarrow H_2O$. PEMs should minimize gas crossover, i.e., minimize the passage of $H_2$ and $O_2$ gas from one side of the cell to the other as well as being robust enough to resist the reducing environment of the cathode and the oxidizing environment of the anode.

Membranes suitable for use with PEMFCs may be prepared from the compositions and polymers described herein. The method for preparing the membrane comprises providing a composition or polymer described herein and forming the membrane. The membrane may be formed by any suitable process, including solution casting as described in the Examples that follow. The method may additionally comprise absorbing water onto the membrane. Suitably at least 10 wt %, 15 wt %, or 20 wt % of water is absorbed onto the membrane.

Definitions

The term "alkyl" as contemplated herein includes a straight-chain or branched alkyl radical in all of its isomeric forms, such as a straight or branched group of 1-12, 1-10, or 1-6 carbon atoms, referred to herein as $C_1$-$C_{12}$ alkyl, $C_1$-$C_{10}$-alkyl, and $C_1$-$C_6$-alkyl, respectively.

The term "alkylene" refers to a diradical of an alkyl group. An exemplary alkylene group is —$CH_2CH_2$—.

The term "haloalkyl" refers to an alkyl group that is substituted with at least one halogen. For example, —$CH_2F$, —$CHF_2$, —$CF_3$, —$CH_2CF_3$, —$CF_2CF_3$, and the like.

The terms "alkoxyl" or "alkoxy" are art-recognized and refer to an alkyl group, as defined above, having an oxygen radical attached thereto. Representative alkoxyl groups include methoxy, ethoxy, tert-butoxy and the like.

An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, and the like. "Ether" as used herein may also include three or more $C_2$-$C_6$ alkyl diradicals covalently linked by oxygens, including three or more $C_2$-$C_4$ alkyl diradicals covalently linked by an oxygen or three or more $C_2$ alkyl diradicals, such as a substituted or unsubstituted ethylenes, covalently linked by an oxygen, e.g., diethers.

The terms "amine" and "amino" are art-recognized and refer to both unsubstituted and substituted amines, wherein substituents may include, for example, alkyl, cycloalkyl, heterocyclyl, alkenyl, and aryl.

The term "aryl" is art-recognized and refers to a carbocyclic aromatic group. Representative aryl groups include phenyl, naphthyl, anthracenyl, and the like. The term "aryl" includes polycyclic ring systems having two or more carbocyclic rings in which two or more carbons are common to two adjoining rings (the rings are "fused rings") wherein at least one of the rings is aromatic and, e.g., the other ring(s) may be cycloalkyls, cycloalkenyls, cycloalkynyls, and/or aryls. Unless specified otherwise, the aromatic ring may be substituted at one or more ring positions with, for example, halogen, azide, alkyl, aralkyl, alkenyl, alkynyl, cycloalkyl, hydroxyl, alkoxyl, amino, nitro, sulfhydryl, imino, amido, carboxylic acid, —C(O)alkyl, —$CO_2$alkyl, carbonyl, carboxyl, alkylthio, sulfonyl, sulfonamido, sulfonamide, ketone, aldehyde, ester, heterocyclyl, aryl or heteroaryl moieties, —$CF_3$, —CN, or the like. In certain embodiments, the aromatic ring is substituted at one or more ring positions with halogen, alkyl, hydroxyl, or alkoxyl. In certain other embodiments, the aromatic ring is not substituted, i.e., it is unsubstituted. In certain embodiments, the aryl group is a 6-10 membered ring structure.

The compounds of the disclosure may contain one or more chiral centers and/or double bonds and, therefore, exist as stereoisomers, such as geometric isomers, enantiomers or diastereomers. The term "stereoisomers" when used herein consist of all geometric isomers, enantiomers or diastereomers. These compounds may be designated by the symbols "R" or "S," depending on the configuration of substituents around the stereogenic carbon atom. The present invention encompasses various stereoisomers of these compounds and mixtures thereof. Stereoisomers include enantiomers and diastereomers. Mixtures of enantiomers or diastereomers may be designated "(±)" in nomenclature, but the skilled artisan will recognize that a structure may denote a chiral center implicitly. It is understood that graphical depictions of chemical structures, e.g., generic chemical structures, encompass all stereoisomeric forms of the specified compounds unless indicated otherwise. Compositions comprising substantially purified stereoisomers, epimers, or enantiomers, or analogs or derivatives thereof are contemplated herein (e.g., a composition comprising at least about 90%, 95%, or 99% pure stereoisomer, epimer, or enantiomer.)

"Chain" means a whole or part of a macromolecule, an oligomer molecule, or a block, comprising a linear or branched sequence of constitutional units between two boundary constitutional units, each of which may be either an end-group, a branch point, or an otherwise-designated characteristic feature of the macromolecule. "Constitutional unit" means an atom or group of atoms (with pendant atoms or groups, if any) comprising a part of the essential structure of a macromolecule, an oligomer, a block, or a chain.

"Double-strand chain" means a chain consisting of an uninterrupted sequence of rings with adjacent rings having one atom in common (spiro chain) or two or more atoms in common (ladder chain). "Double-strand macromolecule" means a macromolecule consisting of an uninterrupted sequence of rings with adjacent rings having one atom in common (spiro macromolecule) or two or more atoms in common (ladder macromolecule). "Double-strand polymer" means a polymer, the macromolecules of which are double-strand macromolecules.

"Macromoleculeule" or "polymer molecule" means a molecule of high relative molecular mass, the structure of which essentially comprises multiple repetitions of units derived, actually or conceptually, from molecules of low relative molecular mass. "Polymer" means a substance composed of macromolecules.

"Oligomer molecule" means a molecule of intermediate relative molecular mass, the structure of which essentially comprises a small plurality of units derived, actually or conceptually, from molecules of lower relative molecular mass. "Oligomer" means a substance composed of oligomer molecules.

"Block" means a portion of a macromolecule, comprising many constitutional units, that has at least one constitutional or configurational feature which is not present in the adjacent portions.

"Monomer molecule" means a molecule which can undergo polymerization, thereby contributing constitutional units to the essential structure of a macromolecule. "Monomeric unit" means the largest constitutional unit contributed by a single monomer molecule to the structure of a macromolecule or oligomer molecule. "Monomer" means a substance composed of monomer molecules.

"Polymerization" means a process of converting a monomer or a mixture of monomers into a polymer. "Cyclopolymerization" means polymerization in which the number of structures in the constitutional units of the resulting macromolecule, oligomer, block, or chain is larger than in the monomer molecules.

Miscellaneous

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus ≥10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The following examples are meant only to be illustrative and are not meant as limitations on the scope of the invention or of the appended claims.

EXAMPLES

We demonstrate proton conductivity in Tröger's base-linked polymers through hydrogen-bonded networks formed from adsorbed water molecules on the oxygen atoms of DB18C6 under humid conditions. Tröger's base-linked polymers—poly(TBL-DB18C6)-t and poly(TBL-DB18C6)-c—synthesized by the in situ alkylation and cyclization of either trans- or cis-di(aminobenzo) [18]crown-6 at room temperature have been isolated as high molecular weight polymers. The macromolecular structures of the isomeric poly(TBL-DB18C6)s have been established by spectroscopic techniques and size-exclusion chromatography. The excellent solubility of these polymers in chloroform allows the formation of free-standing membranes which are thermally stable and also show stability under aqueous conditions. The hydrophilic nature of the DB18C6 building blocks in the polymer facilitates retention of the water as confirmed by water-vapor adsorption isotherms which show a 23 wt % water uptake. The adsorbed water is retained even after reducing the relative humidity to 25%. The proton conductivity of poly(TBL-DB18C6)-t and poly(TBL-DB18C6)-c is found to be $1.4 \times 10^{-4}$ and $1.1 \times 10^{-4}$ mS cm$^{-1}$, respectively, in a humid environment. The proton conductivity arises from the hydrogen bonding and the associated proton hopping mechanism, as supported by a modeling study. In addition to proton conductivity, the Tröger's base-linked polymers reported here promise a wide range of applications utilizing sub-nanometer-sized cavities of the crown ethers and/or the robust film-forming ability.

Treatment of DB18C6 by reacting with a mixture of acetic acid and nitric acid results in the formation of two constitutional isomers, namely trans- and cis-di(nitrobenzo)[18]crown-6. Reduction of these isomers in the presence of $NH_2NH_2 \cdot H_2O$ and 10% Pd/C affords trans- or cis-di(aminobenzo)[18]crown-6. The Tröger's base-linked polymers, poly(TBL-DB18C6)s, were synthesized by a polymerization of trans- or cis-di(aminobenzo) [18]crown-6 with dimethoxymethane in trifluoroacetic acid in an $N_2$ atmosphere at room temperature. In situ formation of formaldehyde from dimethoxymethane enables the alkylation[34] and subsequent cyclization of the amino groups to form ladder-type Tröger's base-linked polymers. Viscous liquids which are obtained after 2 days were poured into aqueous $NH_4OH$ solutions, resulting in formation of precipitates of the two polymers, poly(TBL-DB18C6)-t and poly(TBL-DB18C6)-c from trans-di(aminobenzo)[18]crown-6 and cis-di(aminobenzo)[18]crown-6, respectively. We believe that the relative configurations—syn and anti—defined by the bridging methylene groups in TB are arranged randomly along the polymer backbones.

The fact that poly(TBL-DB18C6)s have good solubilities in CHCl$_3$ may be attributed[33] to their contorted and stereochemically ill-defined macromolecular structures. A film has been obtained from slow evaporation of a solution of poly(TBL-DB18C6)-t (200 mg) in CHCl$_3$ (10 mL) as depicted in the inset in FIG. 1. Slow evaporation of a solution of poly(TBL-DB18C6)-c leads to a similar outcome. Both poly(TBL-DB18C6)s exhibit excellent chemical robustness as indicated by their stabilities in aqueous acidic and basic solutions. The monomers and Tröger's base-linked polymers were characterized by Fourier transform infrared (FTIR) spectroscopy, $^1$H and $^{13}$C nuclear magnetic resonance (NMR) spectroscopy, gel permeation chromatography (GPC), thermogravimetric analysis (TGA), water-vapor adsorption, and atomic force microscopy (AFM).

Figure 3:
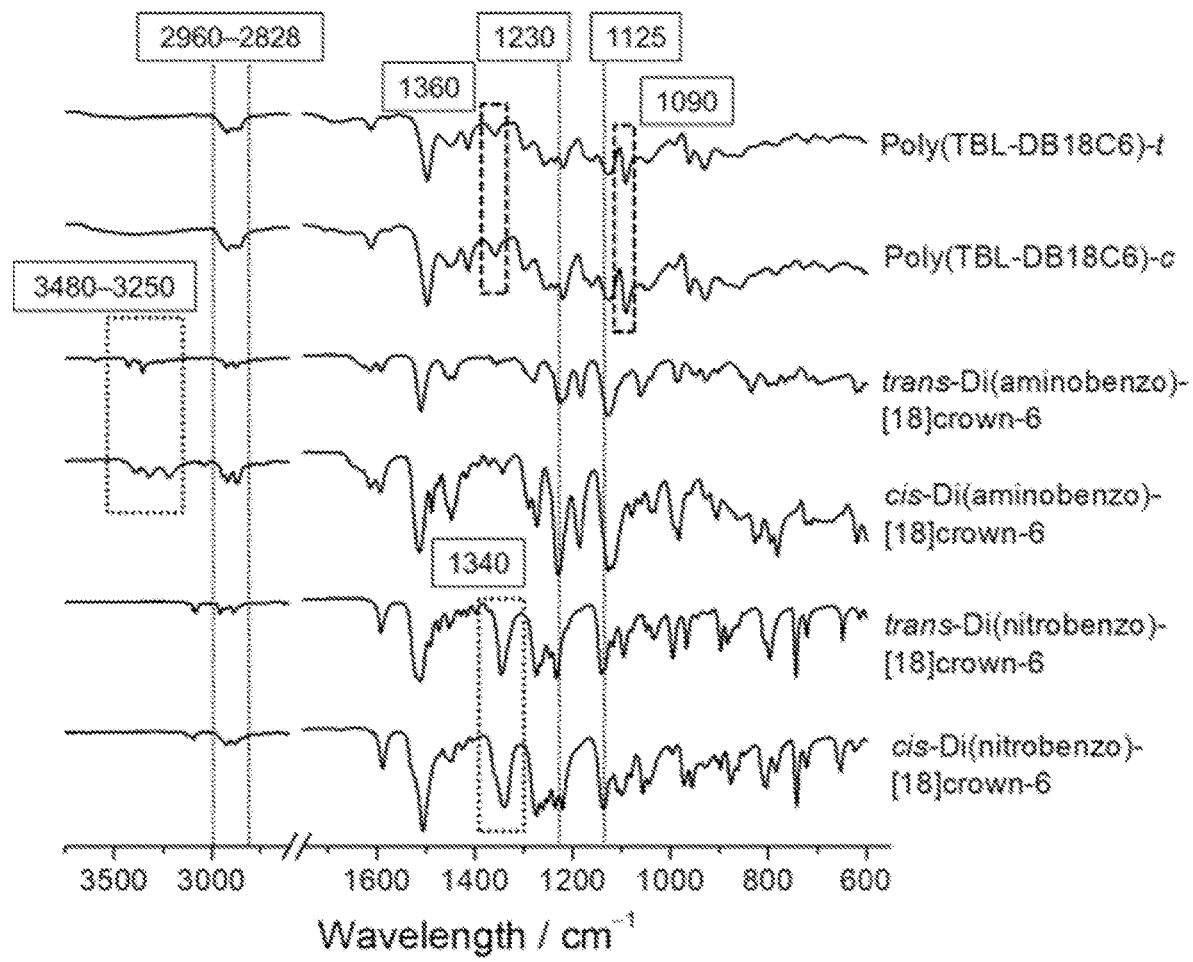
FIG. 3 depicts a FTIR spectra of cis-di(nitrobenzo)[18]crown-6, trans-di(nitrobenzo)[18]crown-6, cis-di(aminobenzo)[18]crown-6, trans-di(aminobenzo)[18]crown-6, poly(TBL-DB18C6)-t, and poly(TBL-DB18C6)-c. FTIR (ATR, 4000-400 cm$^{-1}$, RT): N-H (3480-3250 cm$^{-1}$), C—H (2660-2828 cm$^{-1}$), Ph-O—C(1230 cm$^{-1}$), C—O—C(1125 cm$^{-1}$), N—O (1340 cm$^{-1}$), and C—N(1360, 1090 cm$^{-1}$).
Figure 4:
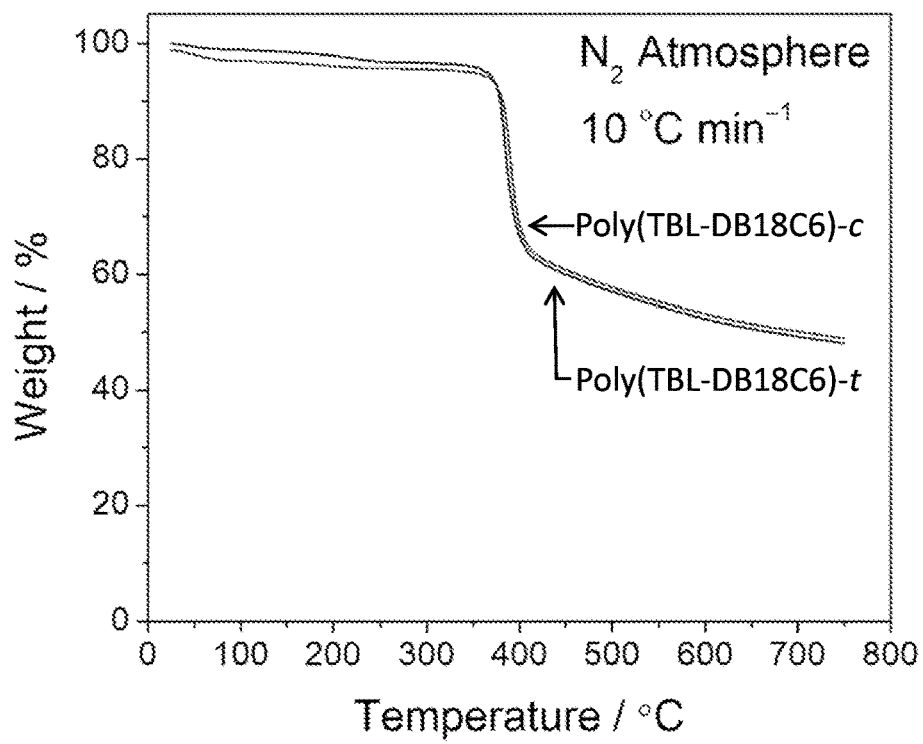
FIG. 4 depicts thermogravimetric analyses (TGA) of poly(TBL-DB18C6)-t and poly(TBL-DB18C6)-c in an N$_2$ atmosphere ranging from 25-800° C. at a heating rate of 10° C. min$^{-1}$. TGAs confirm the thermal stability of these polymers up to 300° C.

FTIR and NMR Spectroscopy:

FTIR Spectra (FIG. 3) were collected in attenuated total reflection mode. The N—O stretching bands at 1340 cm$^{-1}$ of trans- and cis-di(nitrobenzo)[18]crown-6 disappear upon the reduction to give, respectively, trans- and cis-di(aminobenzo)[18]crown-6, characterized by the emergence of N—H stretching bands associated with the amino groups in the range of 3480-3250 cm$^{-1}$. The formation of the Tröger's base-linked polymers—namely, poly(TBL-DB18C6)-t and poly(TBL-DB18C6)-c from trans- and cis-di(aminobenzo)[18]crown-6, respectively were supported by the presence of C—N stretching bands at 1360 and 1090 cm$^{-1}$. Furthermore, the characteristic bands in the range of 2963-2828 cm$^{-1}$, and those centered on 1230 and 1125 cm$^{-1}$, corresponding to C—H stretches and Ar—O—C and C—O—C asymmetric stretches, respectively, proved the integration of DB18C6 into the Tröger's base-linked polymers.

Figure 2A:
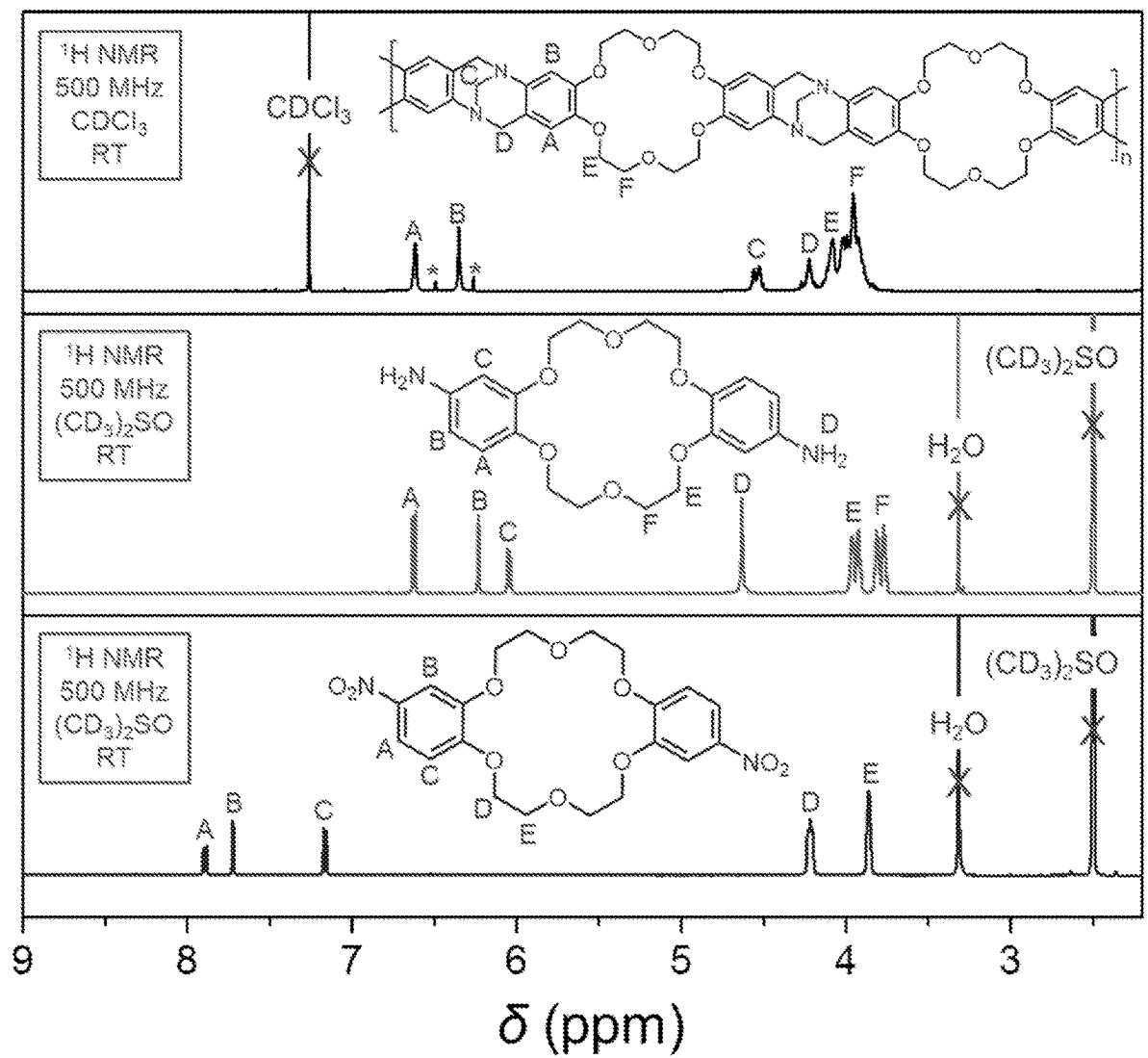
FIG. 2A depicts annotated $^1$H NMR Spectrum (500 MHz, CDCl$_3$/(CD$_3$)$_2$SO, 298K) of trans-Di(nitrobenzo) [18]crown-6, trans-Di(aminobenzo)[18]crown-6, and Poly (TBL-DB18C6)-t. trans-Di(nitrobenzo)[18]crown-6: δ=7.89 (dd, J=9.0, 2.6 Hz, 2H), 7.73 (d, J=2.6 Hz, 2H), 7.16 (d, J=9.1 Hz, 2H), 4.22 (m, 8H), 3.90-3.83 (m, 8H). trans-Di(aminobenzo)[18]crown-6: δ=6.62 (d, J=8.4 Hz, 2H), 6.23 (d, J=2.3 Hz, 2H), 6.05 (dd, J=8.4, 2.3 Hz, 2H), 4.63 (s, 4H), 4.04-3.87 (m, 8H), 3.86-3.71 (m, 8H). Poly(TBL-DB18C6)-t: δ=6.62, 6.35, 4.55, 4.23, 4.16-3.78.
Figure 2B:
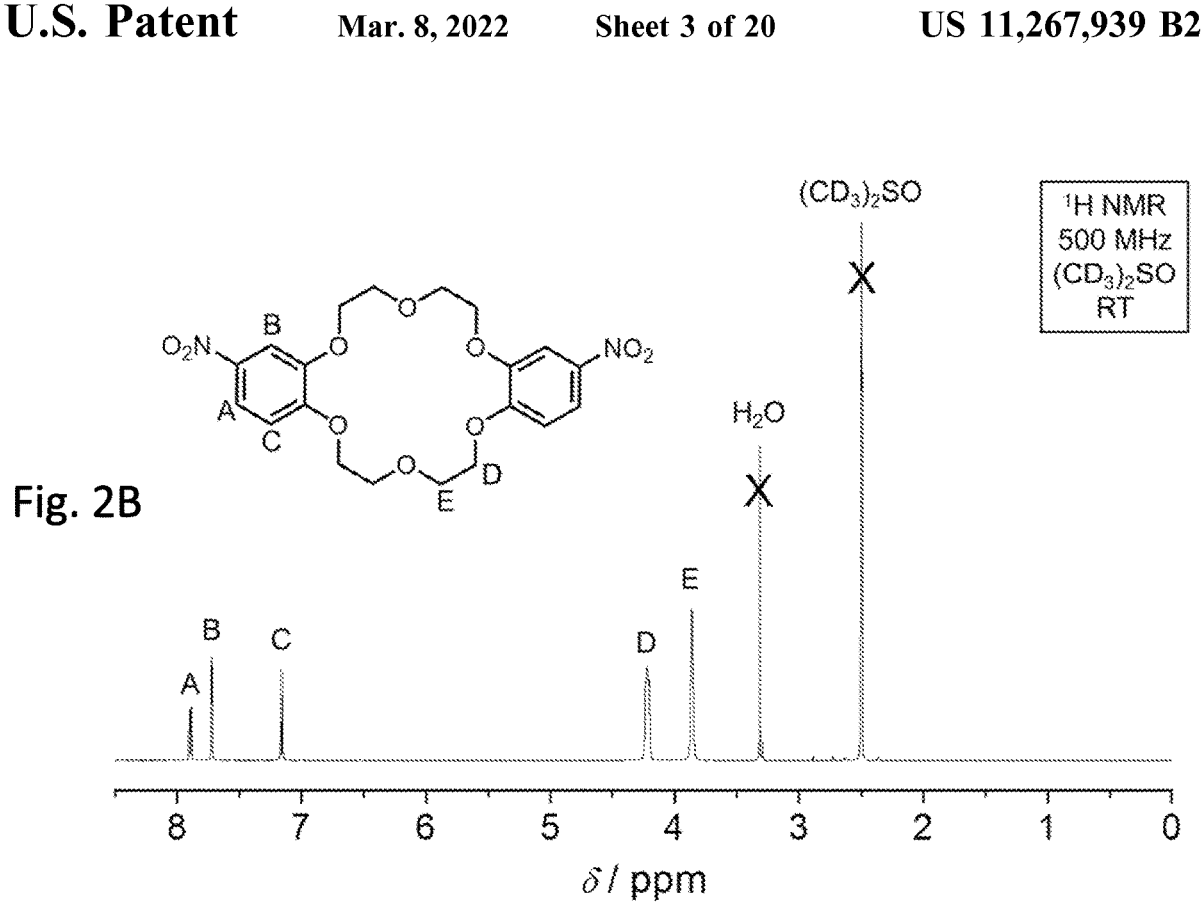
FIG. 2B depicts an annotated $^1$H NMR spectrum (500 MHz, (CD$_3$)$_2$SO, 298 K) of cis-di(nitrobenzo) [18]crown-6.
Figure 2C:
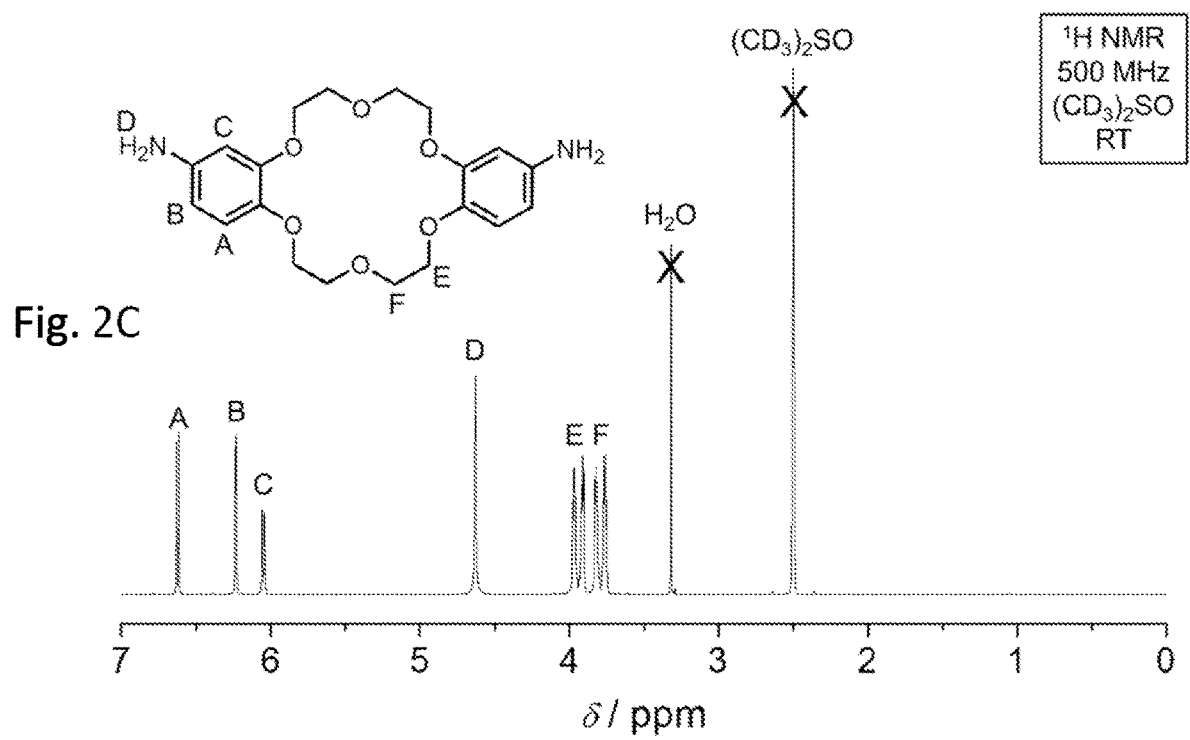
FIG. 2C depicts an annotated $^1$H NMR spectrum (500 MHz, (CD$_3$)$_2$SO, 298 K) of cis-di(aminobenzo) [18]crown-6.
Figure 2D:
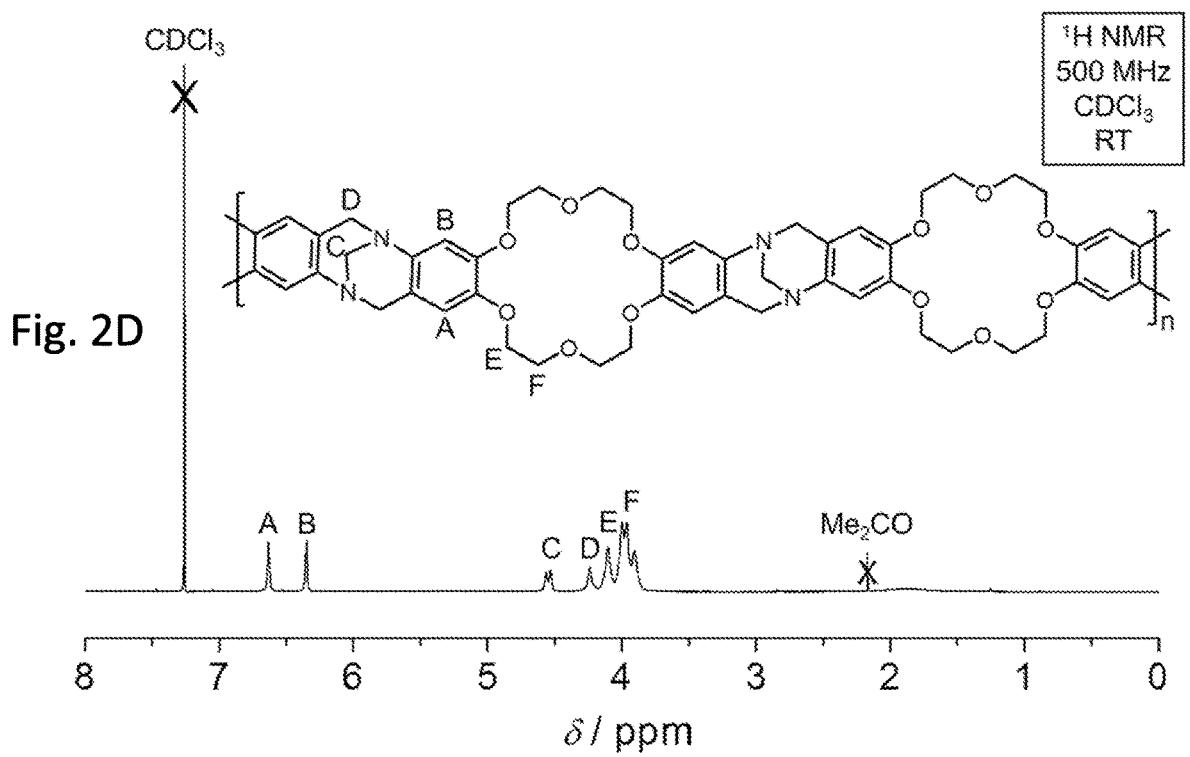
FIG. 2D depicts an annotated $^1$H NMR spectrum (500 MHz, CDCl$_3$, 298 K) of poly(TBL-DB18C6)-c.
Figure 2E:
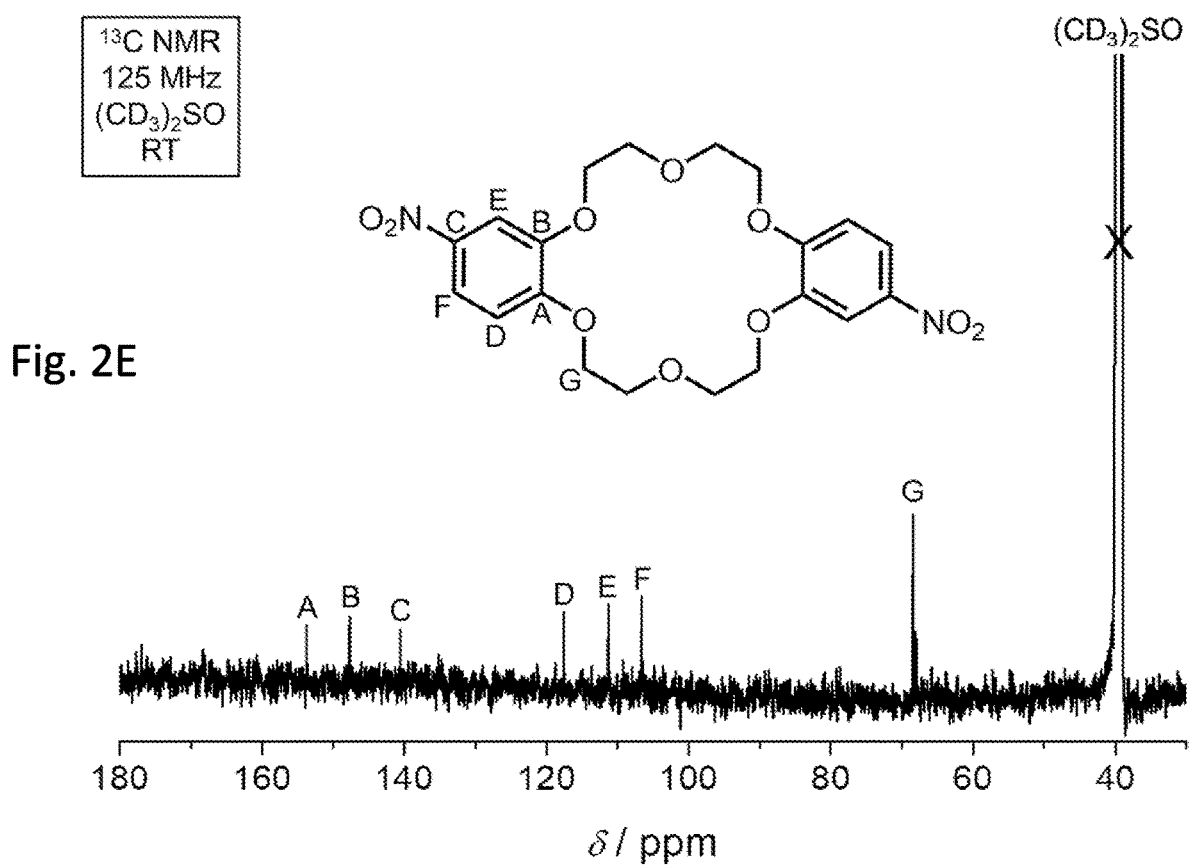
FIG. 2E depicts an annotated $^{13}$C NMR spectrum (125 MHz, (CD$_3$)$_2$SO, 298 K) of trans-di(nitrobenzo) [18]crown-6.
Figure 2F:
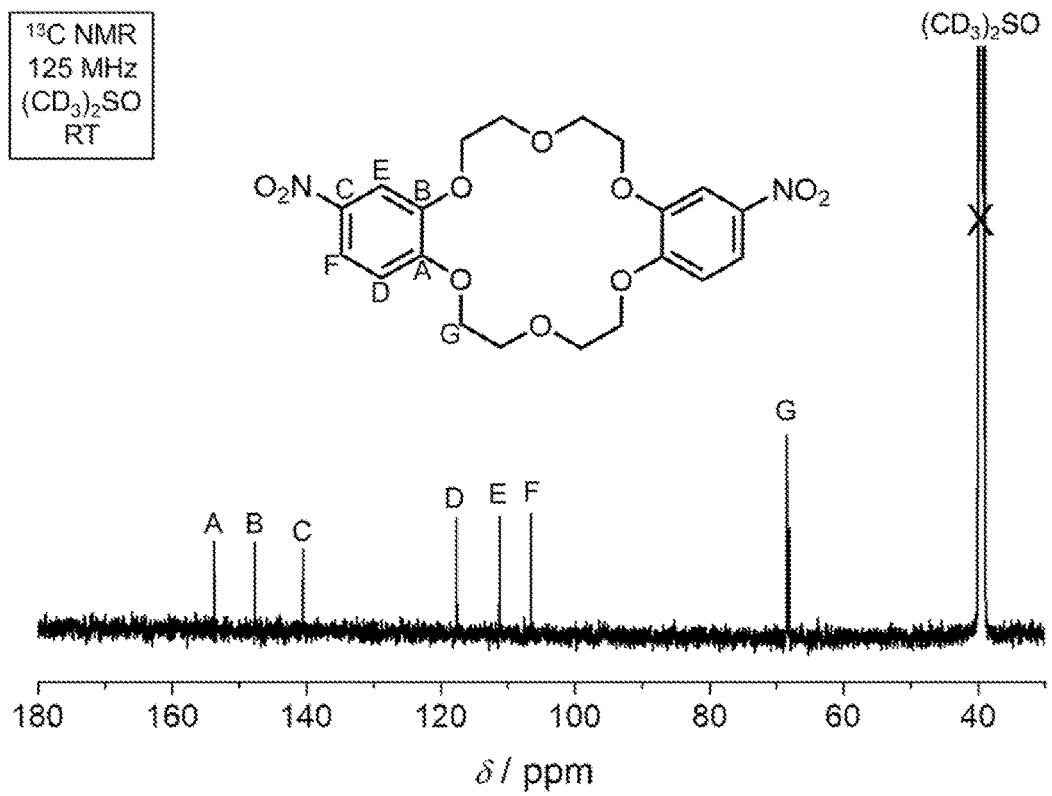
FIG. 2F depicts an annotated $^{13}$C NMR spectrum (125 MHz, (CD$_3$)$_2$SO, 298 K) of cis-di(nitrobenzo) [18]crown-6.
Figure 2G:
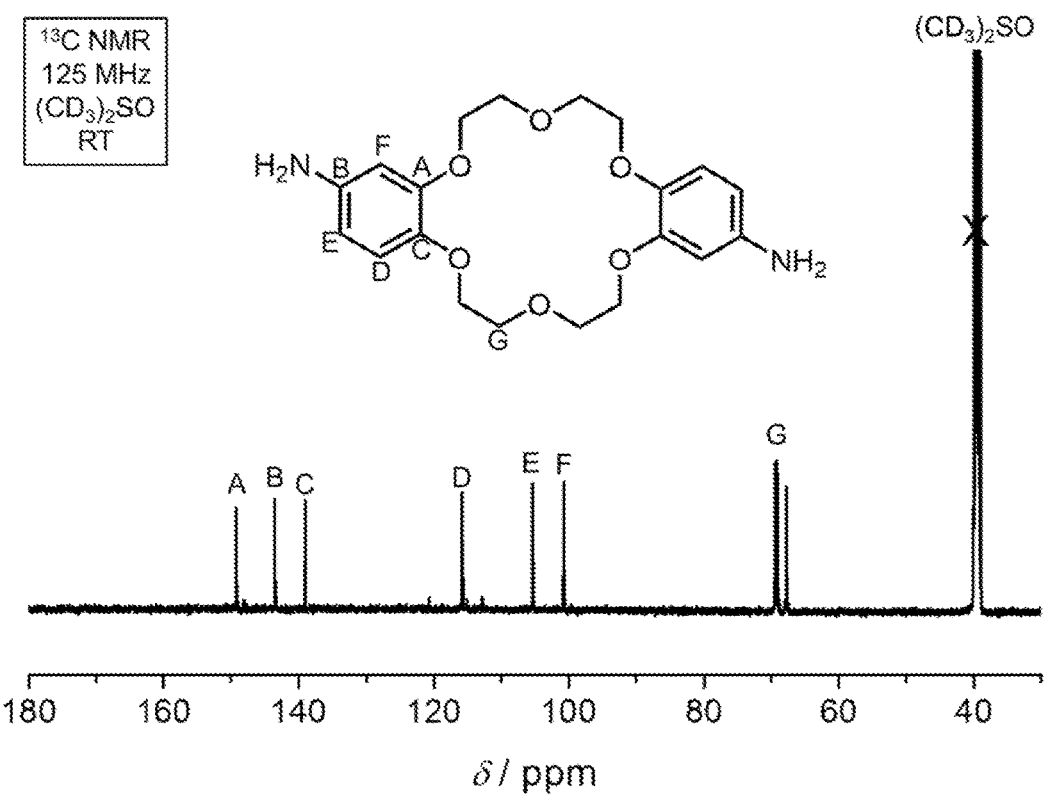
FIG. 2G depicts an annotated $^{13}$C NMR spectrum (125 MHz, (CD$_3$)$_2$SO, 298 K) of trans-di(aminobenzo) [18]crown-6.
Figure 2H:
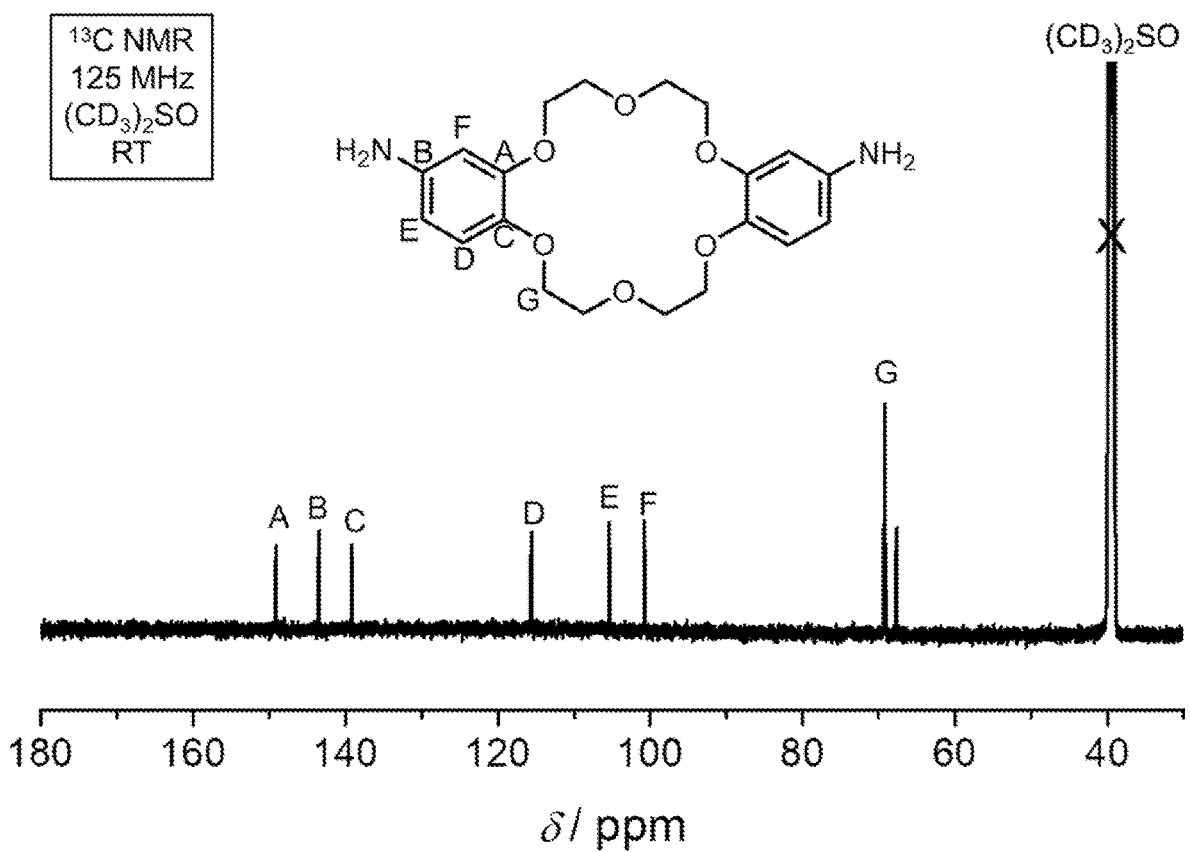
FIG. 2H depicts an annotated $^{13}$C NMR spectrum (125 MHz, (CD$_3$)$_2$SO, 298 K) of cis-di(aminobenzo) [18]crown-6.
Figure 2I:
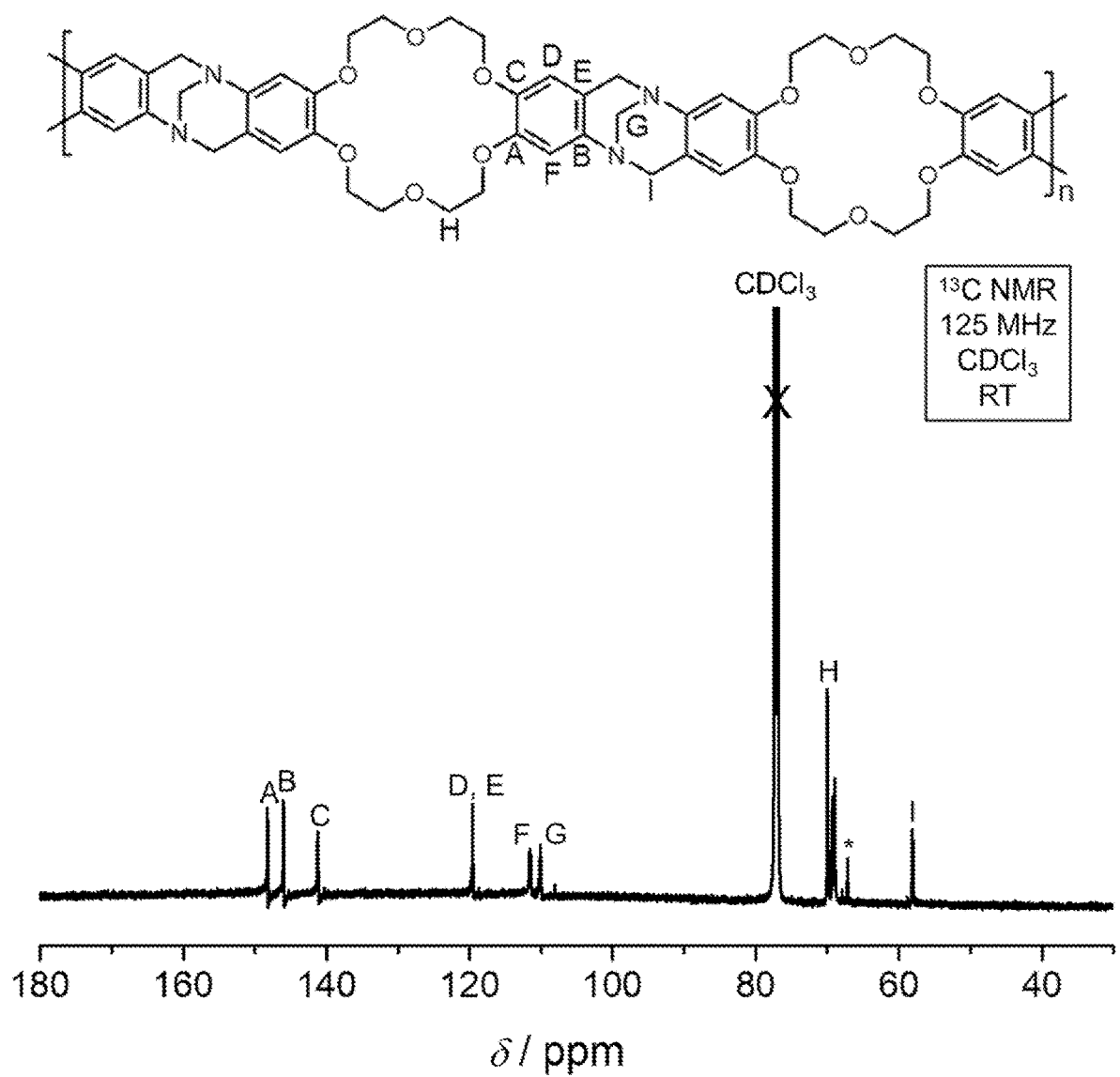
FIG. 2I depicts an annotated $^{13}$C NMR spectrum (125 MHz, CDCl$_3$, 298 K) of poly(TBL-DB18C6)-t.
Figure 2J:
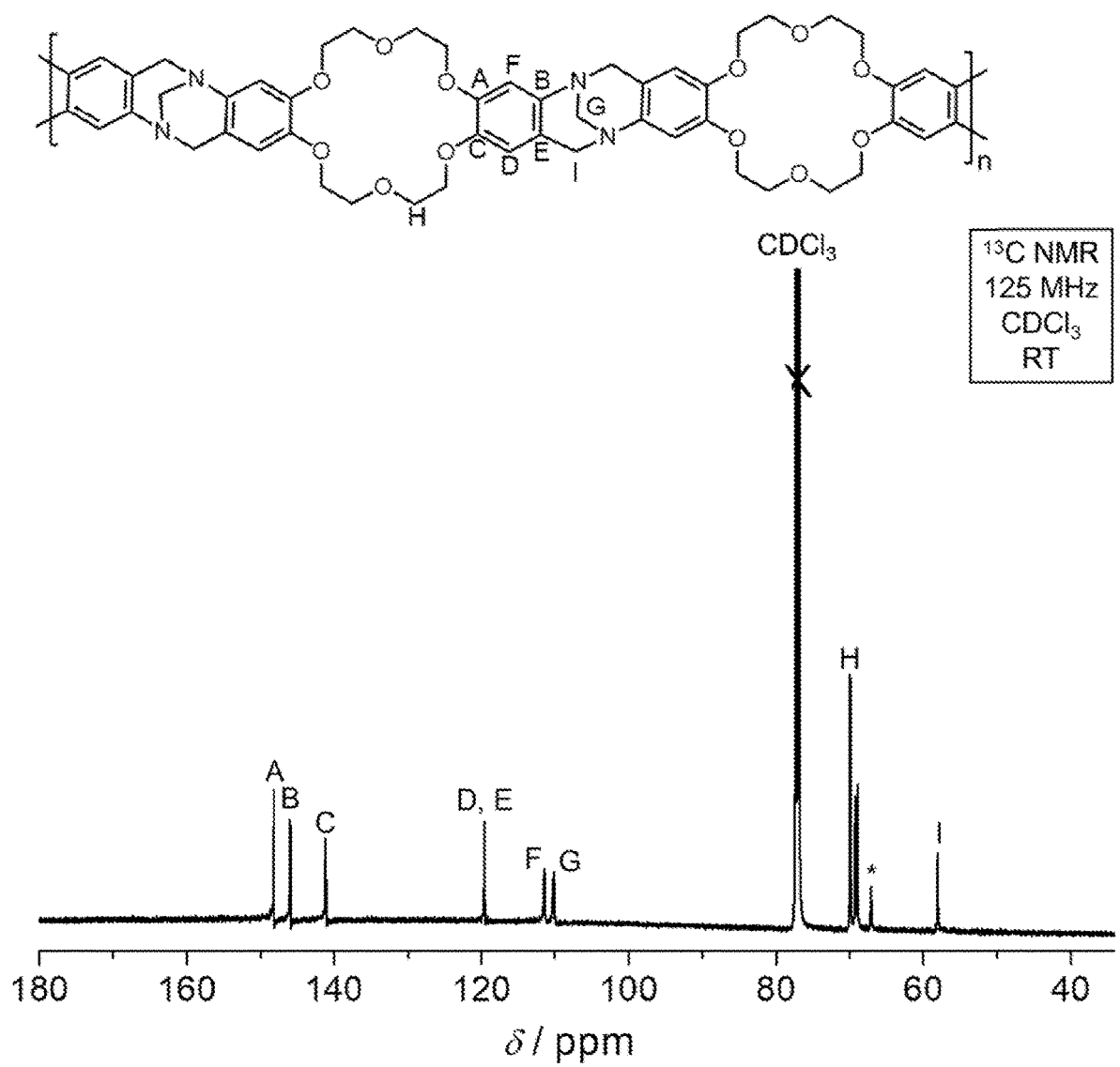
FIG. 2J depicts an annotated $^{13}$C NMR spectrum (125 MHz, CDCl$_3$, 298 K) of poly(TBL-DB18C6)-c.

The formation of the monomers and the Tröger's base-linked polymers were confirmed by recording $^1$H and $^{13}$C NMR spectra (FIGS. 2A-2J) in (CD$_3$)$_2$SO or CDCl$_3$ at room temperature. trans- and cis-Di(nitrobenzo)[18]crown-6 displays the characteristic resonances for the aromatic protons in the downfield region (7.89-7.16 ppm) and for the O-methylene protons in the crown ether in the upfield region (4.22-3.83 ppm) of $^1$H NMR spectrum (FIG. 2A). The resonances of the aromatic protons are shifted upfield (6.62-6.05 ppm) in the case of trans- and cis-di(aminobenzo)[18]crown-6 upon reduction of trans- and cis-di(nitrobenzo)[18]crown-6, respectively. The signal at δ 4.63 ppm is assigned to the amino protons, while the O-methylene protons give rise to resonances in the upfield region at δ 4.06-3.71 ppm. The formation of poly(TBL-DB18C6)-t and poly(TBL-DB18C6)-c were also confirmed by the presence of signals for aromatic and N-methylene protons in the TB repeating units and O-methylene protons in the ranges 6.64-6.35, 4.55-4.23 and 4.16-3.78 ppm, respectively. The $^{13}$C NMR spectra (FIGS. 2E-2J) reveal signals for trans- and cis-di(nitrobenzo)[18]crown-6 at δ=153.7, 147.6, 140.2, 117.5, 111.2, 106.5 and 68.4, which can be assigned to aromatic, N-methylene and δ-methylene carbons. trans- and cis-Di(aminobenzo)[18]crown-6 give rise to resonances at δ=149.2, 143.4, 139.1, 115.6, 105.3, 100.7 and 71.5-65.8 that are shifted upfield on reduction. A step-growth polymerization of trans- or cis-di(aminobenzo)[18]crown-6 leads to the new resonances at δ=110.1 and 58.1 ppm in poly(TBL-DB18C6)-t and poly(TBL-DB18C6)-c, which can be assigned to the N-methylene TB repeating units.

Figure 5:
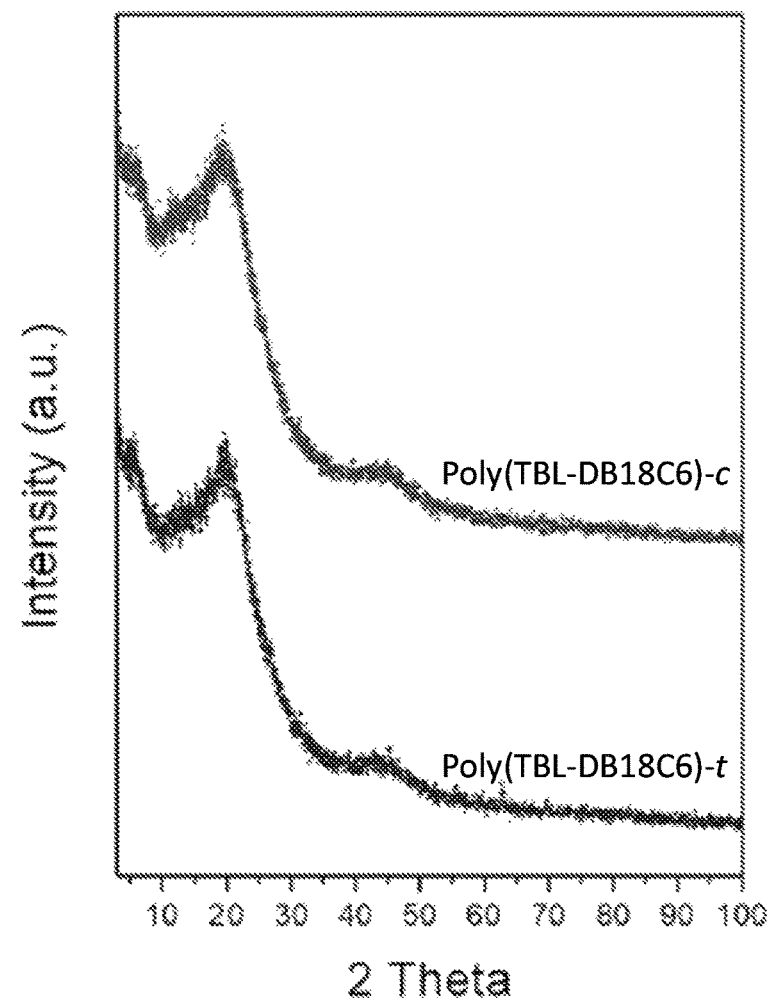
FIG. 5 depicts powder Xray diffraction profiles for poly (TBLDB18C6)t and poly(TBLDB18C6)c. The lack of ordered structure is clearly identified from the PXRD patterns of the Tröger's base linked polymers.
Figure 6:
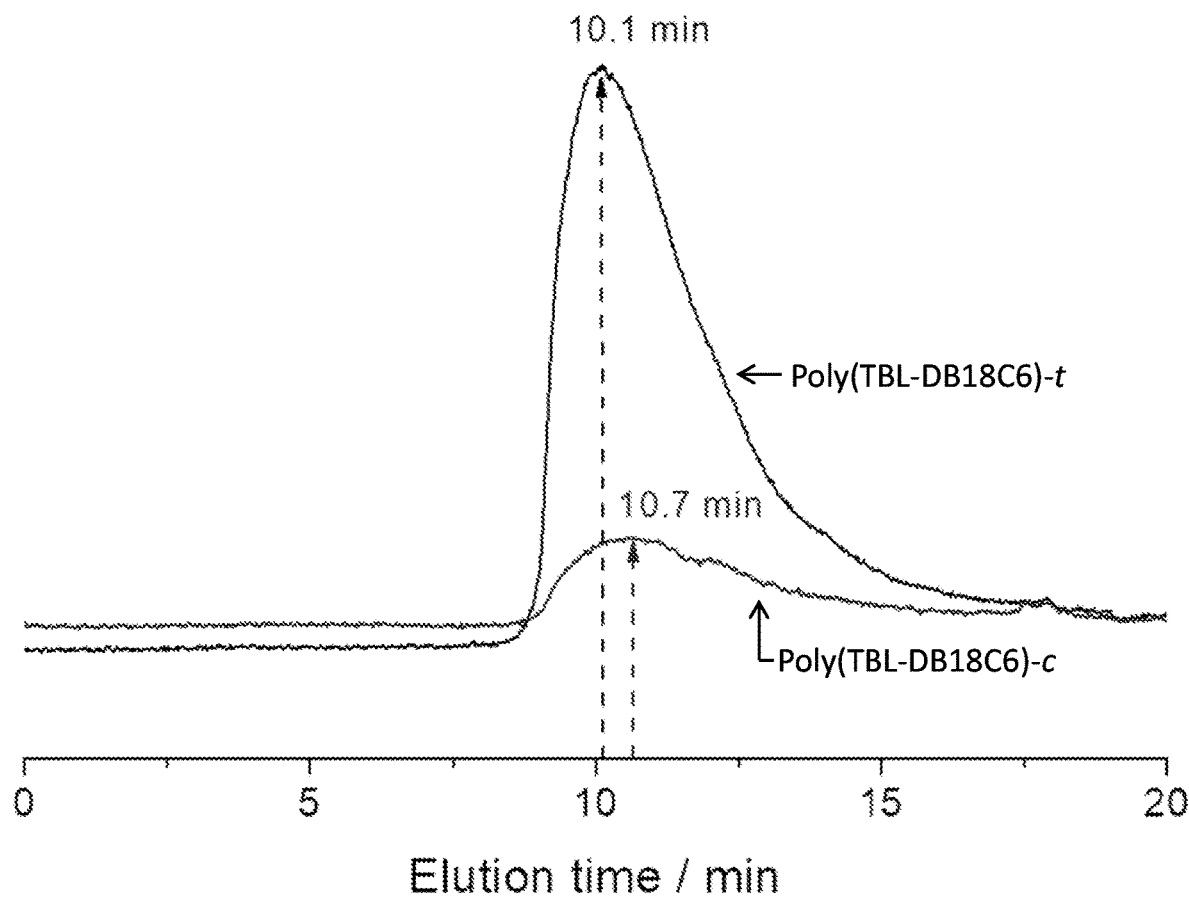
FIG. 6 depicts Gel Permeation Chromatography (GPC) traces for poly(TBL-DB18C6)-t and poly(TBL-DB18C6)-c. Weight average molecular weights were determined from a calibration against polystyrene standards. M$_w$=633,000 and 530,000 Dalton for poly(TBL-DB 18C6)-t and poly(TBL-DB18C6)-c, respectively. Dilute solutions of polymers in CHCl$_3$ were used for the GPC analyses.

Thermal Stability, Average Molecular Weight, and Water-Vapor Adsorption Analyses:

TGA Profiles (FIG. 3) for poly(TBL-DB18C6)-t and poly(TBL-DB18C6)-c in the range of 25-800° C. in an N$_2$ atmosphere indicate that both polymers undergo almost identical degradation processes. Poly(TBL-DB18C6)-t and poly(TBL-DB18C6)-c were thermally stable up to 360° C. in an inert atmosphere. The initial weight losses, observed for both polymers, can be associated with trapped solvents. Powder X-ray diffraction profiles (FIG. 5) for poly(TBL-DB18C6)-t and poly(TBL-DB18C6)-c were collected to confirm the formation of crystalline or amorphous structures. The lack of ordered structure is clearly identified from the patterns of the TB-linked polymers. The good solubilities of poly(TBL-DB18C6)-t and poly(TBL-DB18C6)-c in CHCl$_3$ made it possible to determine their weight-average molecular weights ($M_w$) by GPC analyses (FIG. 6). Calibration of the GPC column using polystyrene standards indicated that the polymerization yields Tröger's base-linked polymers with $M_w$=633,000 and 530,000 Daltons for poly(TBL-DB18C6)-t and poly(TBL-DB18C6)-c, respectively. It is worth mentioning that the high $M_w$ values, along with good thermal stabilities and excellent solubilities of the Tröger's base-linked polymers made it possible to form robust films using the solvent-casting method. The film-forming property is one of the significant parameters for any materials to be considered for PEMs in fuel cell membrane electrode assemblies, fabricated for proton conduction with long-range order.

Figure 7A:
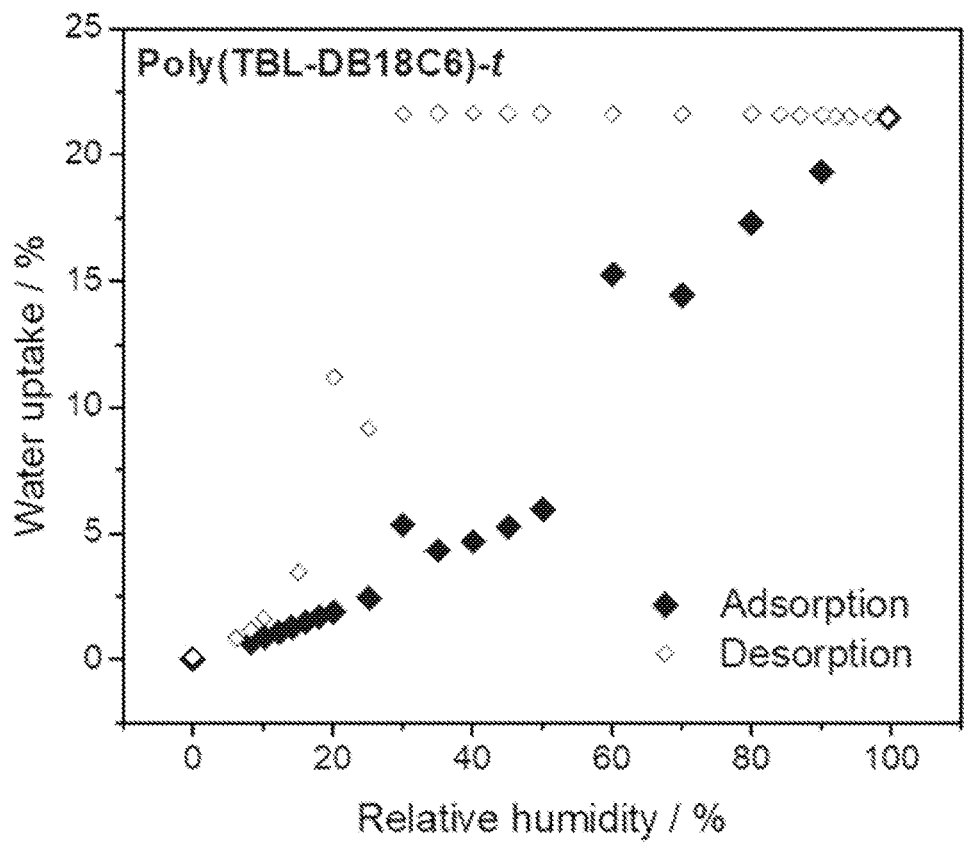
FIG. 7A-7B depicts water adsorption-desorption isotherms of (FIG. 7A) poly(TBL-DB18C6)-t and (FIG. 7B) poly(TBL-DB18C6)-c at 25° C., showing H$_2$O vapor uptake capacities (% wt) with respect to relative humidity.
Figure 7B:
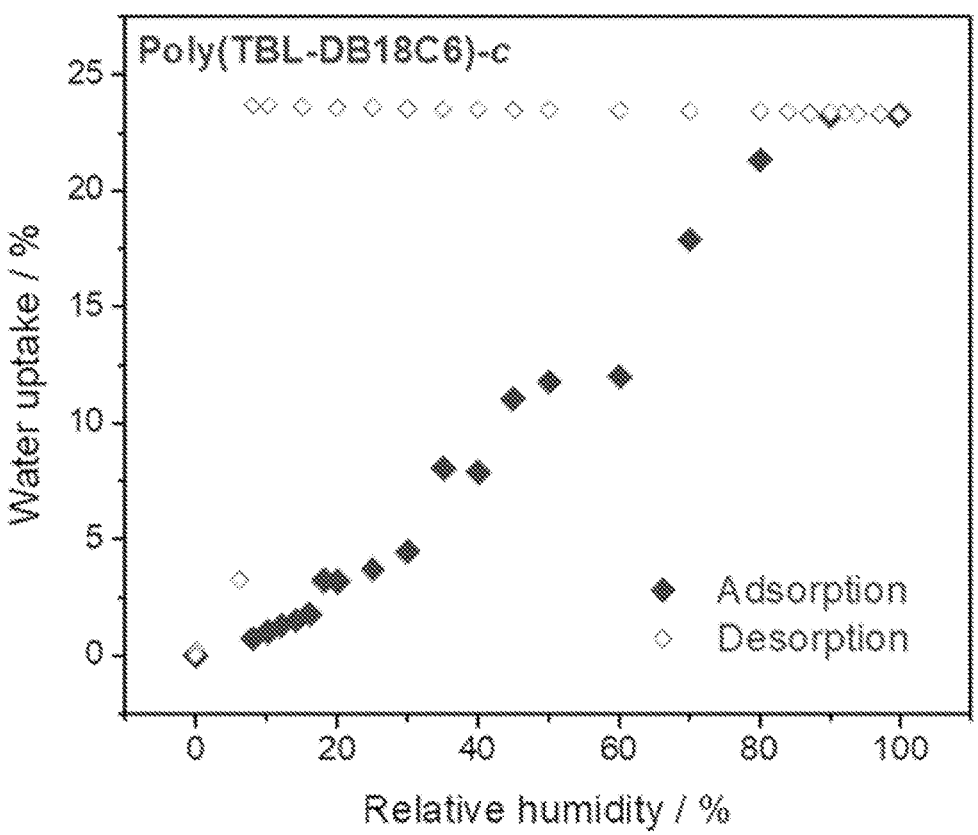

Proton conduction in PEMs can occur by one of two mechanisms[38-41]—either a vehicle mechanism (migrating protons) or a Grotthuss mechanism (hopping of protons associated with hydrogen bonds)—depending on the functional groups present in the materials. Here, we fused a hydrophilic building block, DB18C6, into ladder-type polymers connected by TB linkages. Water-vapor adsorption studies were conducted in order to verify the $H_2O$ uptake efficiencies of the Tröger's base-linked polymers. Water adsorption-desorption isotherms (FIGS. 7A-7B) for poly(TBL-DB18C6)-t and poly(TBL-DB18C6)-c show water-vapor uptake capacities with respect to a relative humidity (RH). Both polymers demonstrate water-uptake capacities of 23 wt % at 90% RH. Remarkably, they show significant hysteresis and retain water molecules, even after reducing the RH to 25% and confirming the water retention characteristic of poly(TBL-DB 18C6)-t and poly(TBL-DB18C6)-c.

Figure 8A:
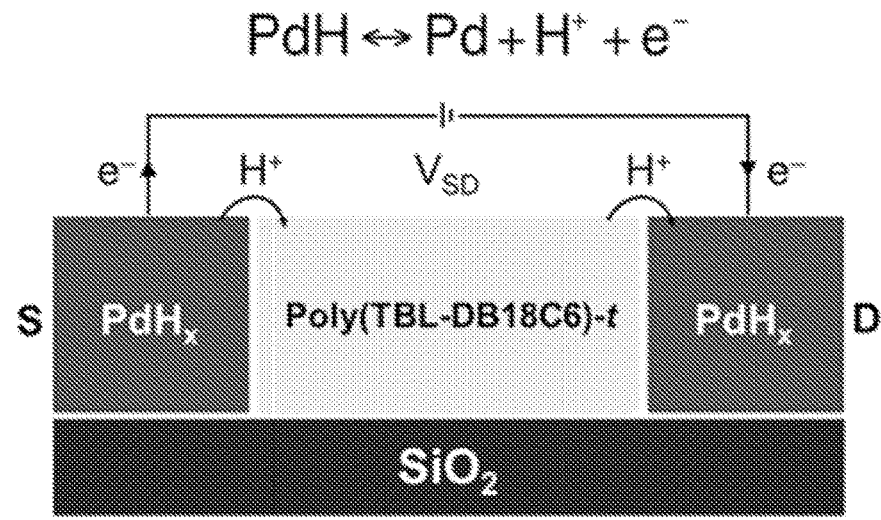
FIGS. 8A-8G depicts Proton Conductivity Measurements.
Figure 8B:
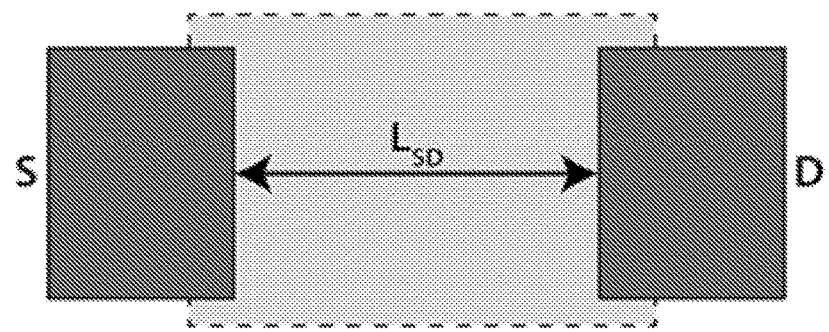
Figures 9A, 9B, 9C:
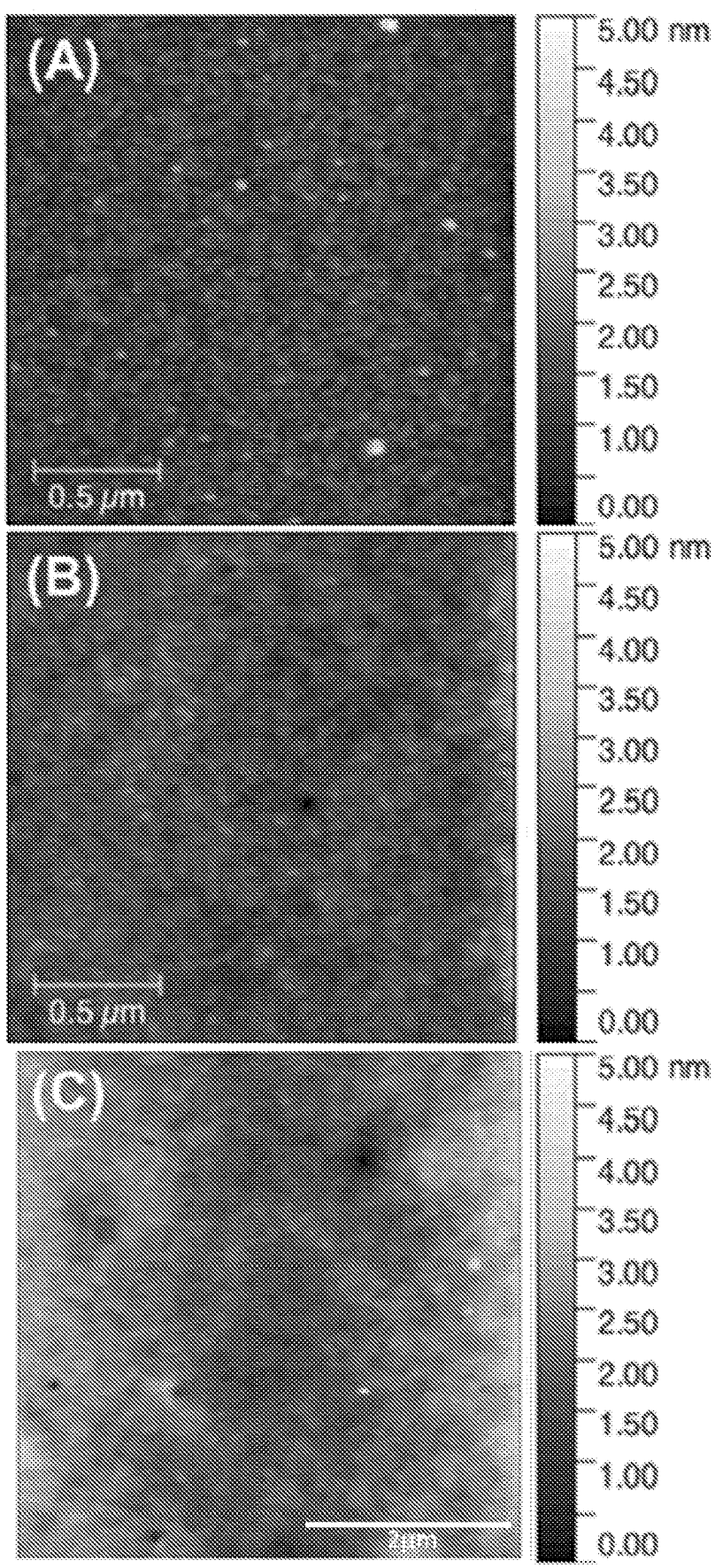
FIGS. 9A-9C depicts representative AFM Images of (FIG. 9A) an uncoated transmission line device channel and poly(TBL-DB18C6)-t (FIG. 9B) and coated poly(TBL-DB 18C6)-c (FIG. 9C) channel under ambient condition. The uncoated and poly(TBL-DB18C6)-t coated device has an RMS roughness of 0.262 and 0.242 nm, respectively. The low RMS roughness for poly(TBL-DB18C6)-t and poly (TBL-DB18C6)-c coated channel corresponds to a uniform coating of a channel device.

Proton Conductivity (σ):

We performed proton conductivity measurements on poly (TBL-DB18C6)-t and poly(TBL-DB18C6)-c. with a standard two-terminal (FIG. 8A) and a transmission line (TML) geometry-based devices (FIG. 8B) according to a procedure reported[42,43] in the literature. In brief, a solution of poly (TBL-DB18C6)-t or poly(TBL-DB18C6)-c in $CHCl_3$ (20 mg $mL^{-1}$) was spin-coated onto devices at 500 rpm for 5 s prior to drying at 80° C. for 2 h. Poly(TBL-DB18C6)-t or poly(TBL-DB18C6)-c forms a continuous film on a $SiO_2$ surface between two Pd contacts (source, S and drain, D) as visualized (FIGS. 9A-9C) by AFM imaging. With a source-drain potential difference, $VS_D$, the $PdH_x$ source and drain inject and drain protons ($H^+$) into and from the poly(TBL-DB18C6) channel, effectively serving as protodes (FIG. 3A). For each proton injected into poly(TBL-DB18C6) or, an electron is collected by the leads, which complete the circuit and results in a current measured at the drain ($I_D$). Bulk and contact resistances (FIG. 3B) are separated using a TLM geometry in which the source-drain length ($L_{SD}$) ranges from 5 to 200 μm.[42]

Figure 8C:
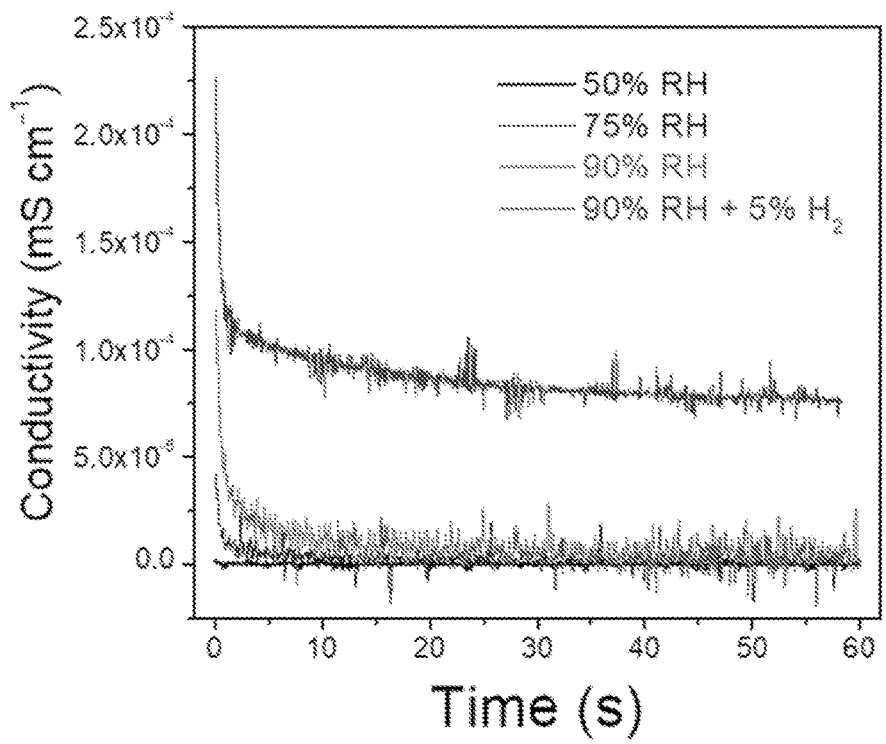

We performed DC measurements of electrical conductivity (FIG. 8C), calculated from $I_D$, as a function of time (t) at room temperature in $N_2$ and $H_2$ atmospheres with controlled RH at an applied $V_{SD}$ of 1V. At 50 and 75% RH, poly(TBL-DB18C6)-t shows almost no electrical conductivity in an $N_2$ atmosphere with Pd contacts that are electronically conducting but are not proton conductive. This result indicates that the poly(TBL-DB18C6)-t channel is not conductive towards electrons, which are the only species able to contribute to electrical conductivity at low RHs since the movement of ions and protons require a highly hydrated material.

Figure 8D:
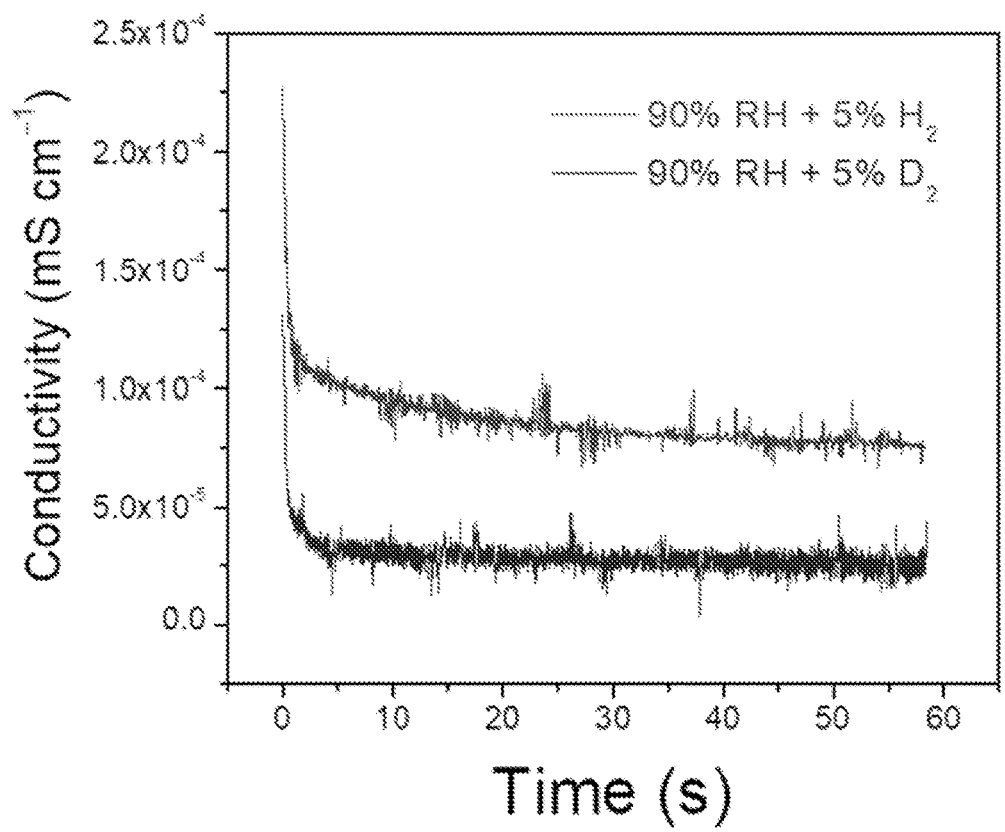
Figure 8E:
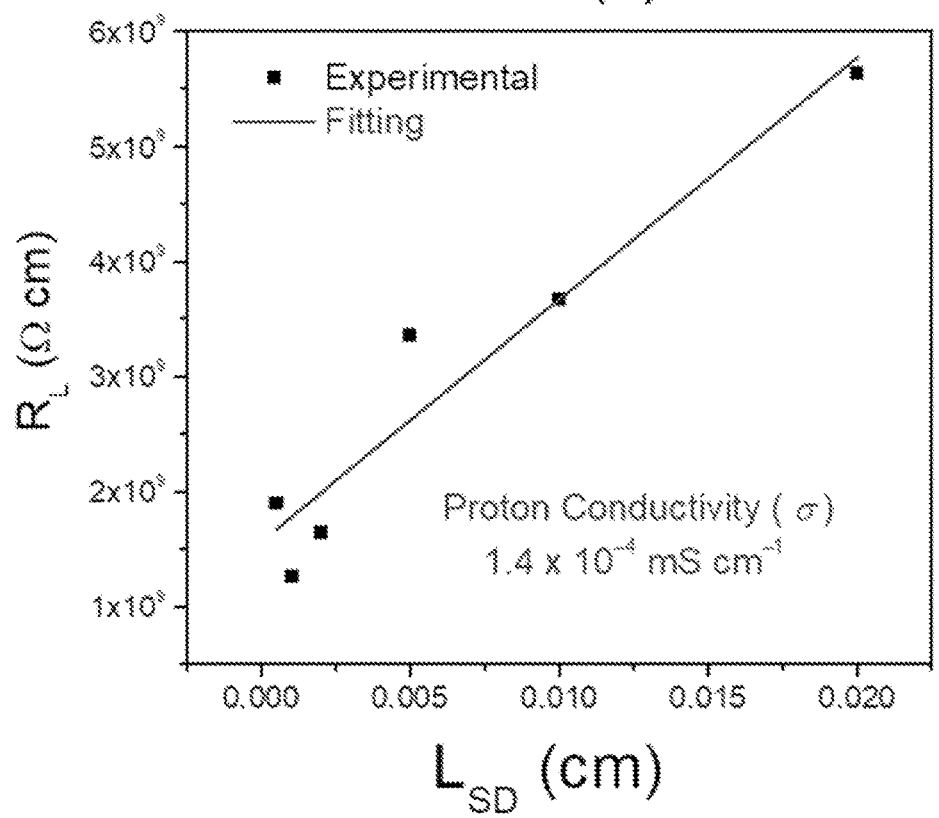
Figure 8F:
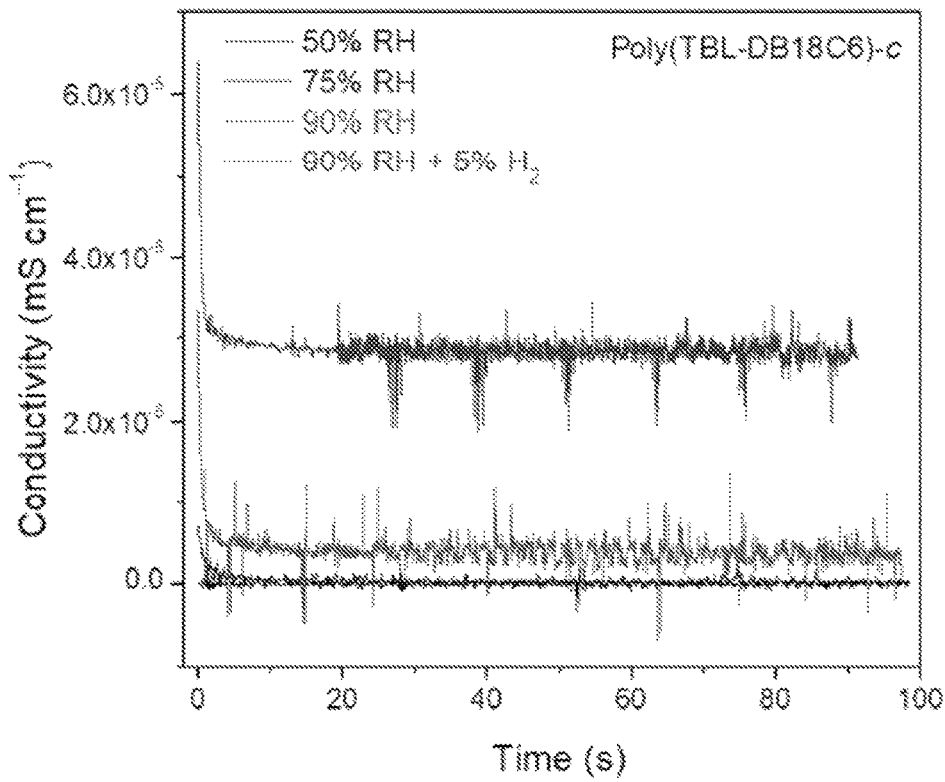
Figure 8G:
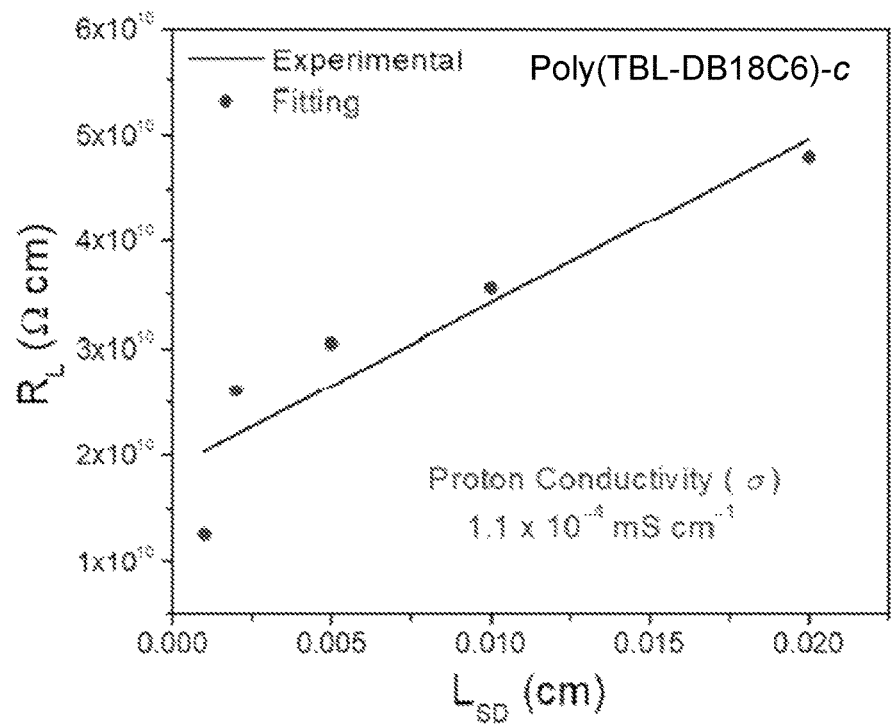

At 90% RH, ionically conductive materials are generally hydrated enough to support conduction. We do not observe a significant increase in conductivity when the RH is increased to 90% using electronically conducting Pd contacts in an $N_2$ atmosphere. A sharp increase in electrical conductivity related to the conduction of protons, however, was observed when the atmosphere was switched to a gas mixture (95% $N_2$+5% $H_2$) by forming proton conducting $PdH_x$ contacts. The fact that conductivity arises from protons, rather than from other ions, was confirmed (FIG. 8D) with the kinetic isotope effect (KIE).[30,42] Measurements were conducted by hydrating poly(TBL-DB18C6)-t with deuterated water ($D_2O$) and exposing Pd to deuterium ($D_2$) instead of hydrogen. Although deuterium ions ($D^+$) have the same transport mechanism as protons in a hydrated poly (TBL-DB18C6)-t, the mobility of $D^+$ ions is lower than that of protons, leading to a decrease in conductivity. This decrease in $D^+$ ion conductivity, in keeping with the KIE, is a characteristic signature for conductivity based primarily on protons.[42] The TLM geometry allows for the separation of bulk and contact resistances since the bulk resistance of the channel scales linearly with $L_{SD}$, while the resistances at the source-polymer and drain-polymer channel remain constant.[42] A plot of $R_L$, the channel resistance normalized as a function of different channel widths of the devices, $L_{SD}$ leads to a linear fit (FIG. 8E), the slope of which is proportional to the channel resistivity. We calculated the bulk proton conductivity of poly(TBL-DB18C6)-t to be $1.4 \times 10^{-4}$ mS $cm^{-1}$, which is consistent with the data from the two-terminal geometry. Poly(TBL-DB18C6)-c shows (FIGS. 8F-8G) proton conductivity of $1.1 \times 10^{-4}$ mS $cm^{-1}$. A relatively low proton conductivity is expected in an unmodified poly(TBL-DB 18C6)-t without acid functionalities and a comparably low number of charge carriers.

Figure 10A:
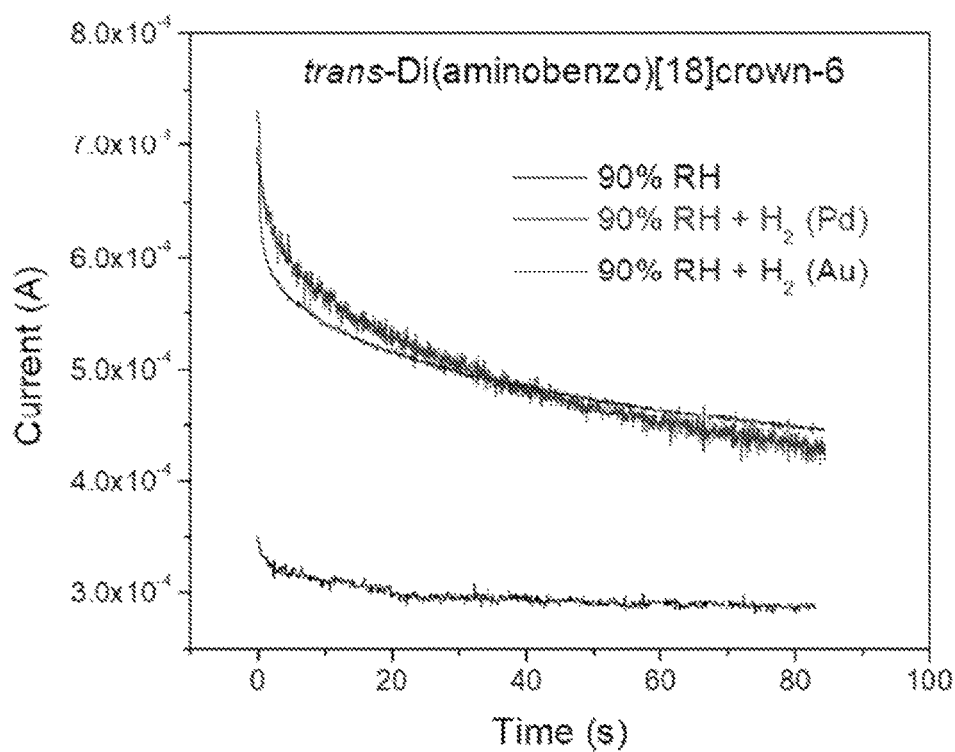
FIGS. 10A-10B depicts conductivity measurement in devices with 50 μm gaps and 1V applied bias for (FIG. 10A) trans-di(aminobenzo)[18]crown-6 and (FIG. 10B) cis-di (aminobenzo)[18]crown-6. High current with Au electrodes and the relatively small difference in current between Au and Pd contacts indicate that electronic conduction is present in the monomers.
Figure 10B:
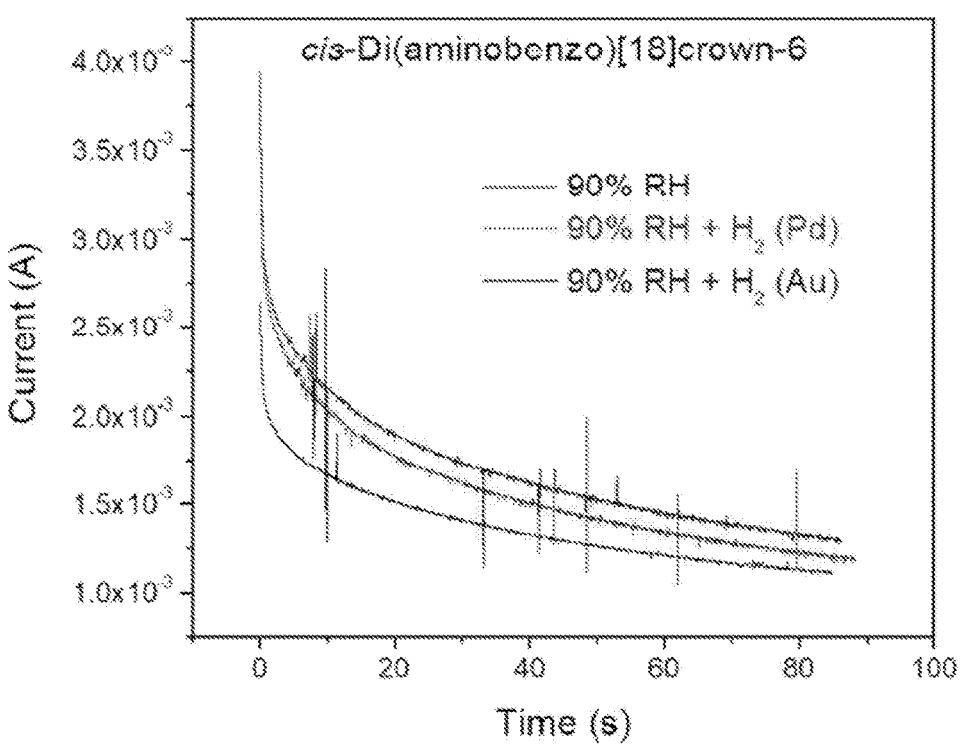

We have also carried out conductivity studies (FIGS. 10A-10B) of monomers and trans- and cis-di(aminobenzo) [18]crown-6. Both monomers demonstrated higher the number of electronic conductivities, which clearly suggest the higher number of electrons passing through the monomers. The two isomers trans- and cis-di(aminobenzo)[18]crown-6 show a high electronic conductivity likely because of it-stacking in the monomers. Although this property may be of interest, low electronic conductivity with proton conductivity is necessary for PEM applications. It is noteworthy to mention that there are no reports on proton conductivity studies on crown ether based polymers; therefore, we compared (Table 1) TB-linked polymers with metallo-supramolecular materials and related polymers. TB-linked polymers showed proton conductivity in addition to film-forming ability.

TABLE 1

Comparison of proton conductivity and film-forming ability of Tröger's base-linked polymers with supramolecular polymers.

| Materials | Proton Conductivity (S $cm^{-1}$) | Free-standing film formation ability | Reference |
| --- | --- | --- | --- |
| Poly(TBL-DB18C6)-t | $1.4 \times 10^{-7}$ | Yes | This work |
| Poly(TBL-DB18C6)-c | $1.1 \times 10^{-7}$ | Yes | This work |
| Pt(II)-based metallo-supramolecular polymer | $1.5 \times 10^{-5}$ | No | ACS Appl. Mater. Inter. 2017, 9 (15), 13406-13414 |
| Mo(VI)-based metallo-supramolecular polymer | $8.5 \times 10^{-5}$ | No | Chem. Commun. 2015, 51, 11012-11014 |
| Benzotriazole-based comb polymers | $6 \times 10^{-6}$ | No | Nat. Chem. 2010, 2, 503-508 |
| LiCl@RT-COF-1 | $6.45 \times 10^{-3}$ | No | J. Am. Chem. Soc. 2017, 139(29), 10079-10086 |
| Im@Td-PNDI | $9.04 \times 10^{-5}$ | Yes | J. Am. Chem. Soc. 2015, 137, 913-918 |
| [Zn(HPO$_4$)—(H$_2$PO$_4$)](ImH$_2$)$_2$ coordination polymer | $2.6 \times 10^{-4}$ | No | J. Am. Chem. Soc. 2012, 134, 7612-7615 |
| CB[6]•H$_2$SO$_4$ | $1.3 \times 10^{-3}$ | No | Angew. Chem. Int. Ed. 2011, 50, 7870-7873 |

Figure 12A:
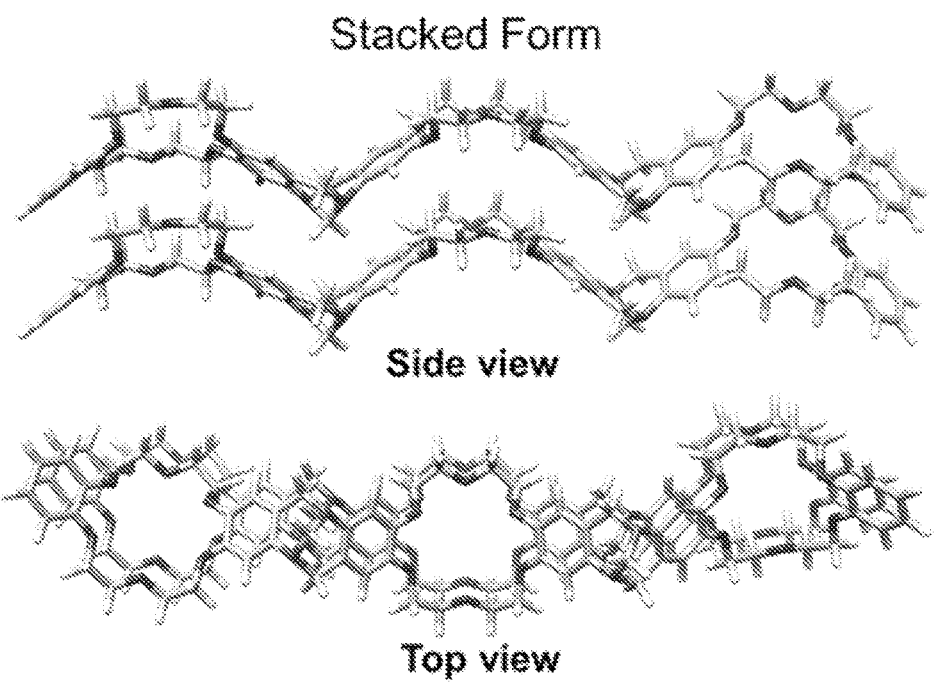
FIGS. 12A-12B illustrates structures from DFT optimization of the (FIG. 12A) stacked and (FIG. 12B) displaced forms of the double layer at a 5.2 Å inter-layer distance (as measured between atom centers).
Figure 12B:
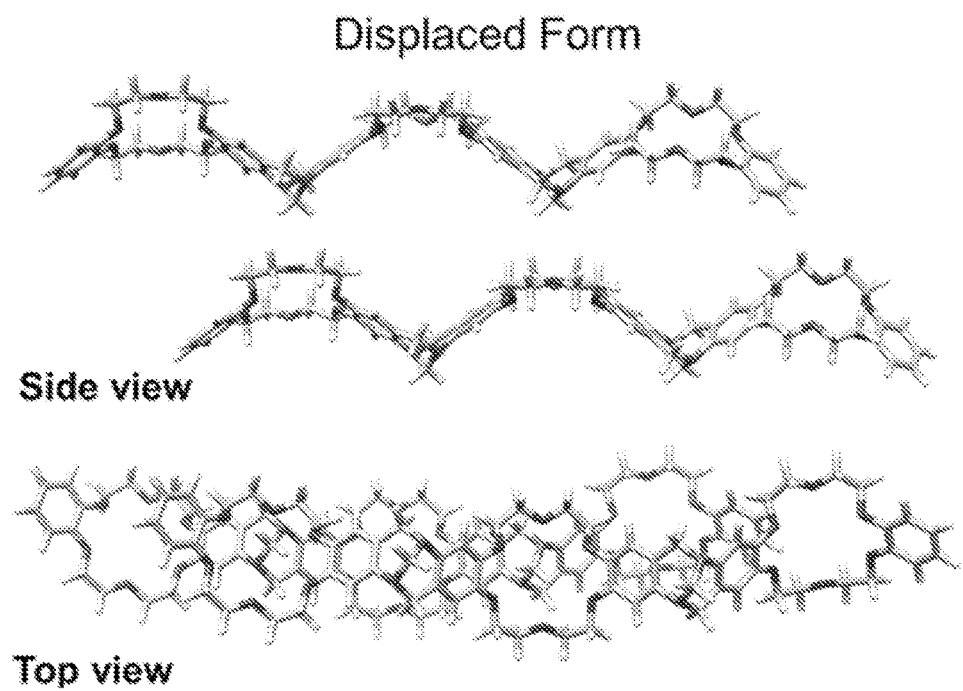
Figure 13:
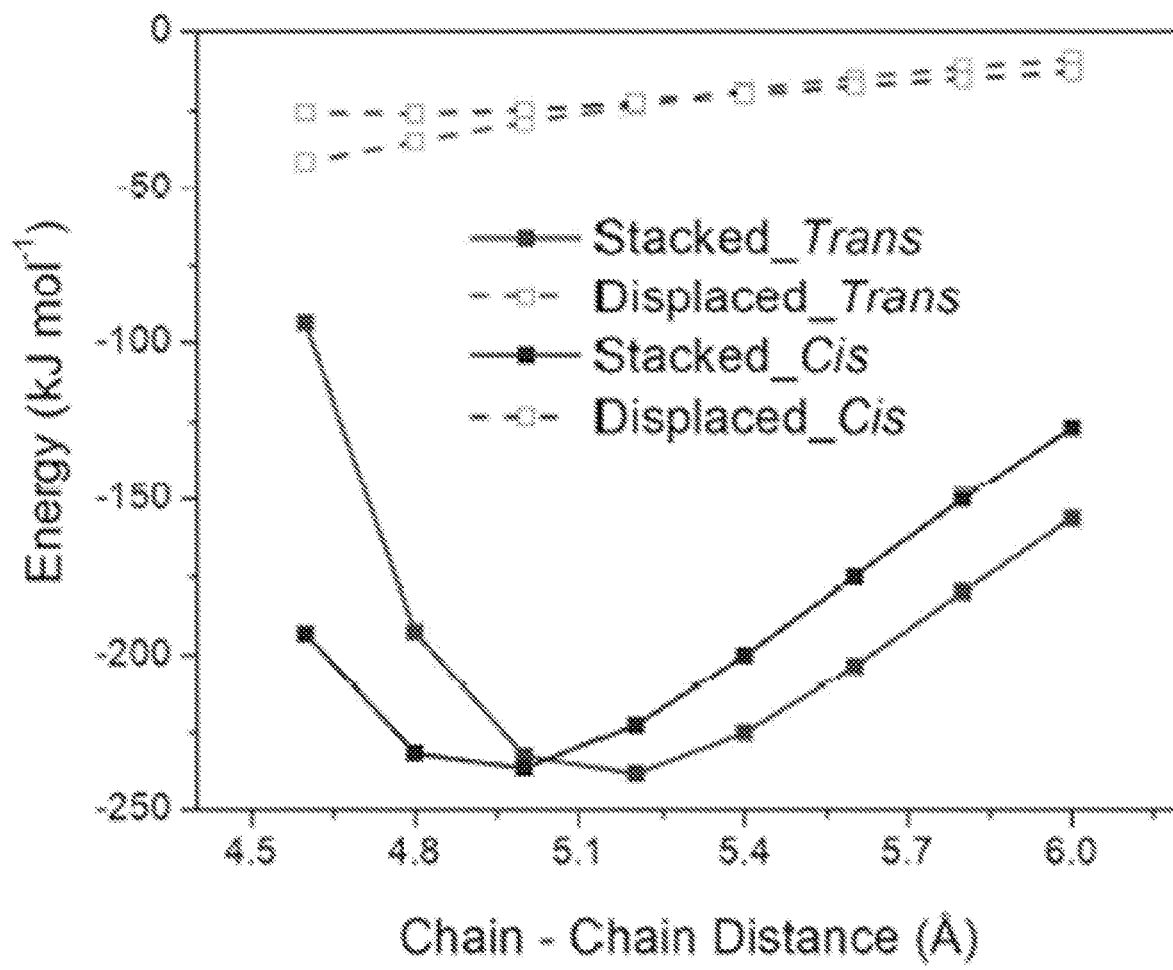
FIG. 13 shows potential energy surfaces of the double layer in stacked and displaced forms of representative units of poly(TBL-DB18C6)-t and poly(TBL-DB18C6)-c, computed at B97D3/6-31G(d) level with the geometry of each layer kept fixed during the scan. The data curves appear in the following order form top to bottom on the left side of the graph: Displaced Cis, Displaced Trans, Stacked Trans, then Stacked Cis.

Proton conductivity in hygroscopic PEMs is understood to arise through the organization of $H_2O$ molecules and acidic functions into hydrogen-bonded networks that facilitate the rapid tunneling-like transport of protons, known as proton wires and employing the Grotthuss mechanism.[6,8,30] We believe the adsorbed $H_2O$ molecules and oxygen atoms in the DB18C6 cavities in poly(TBL-DB18C6) can support the formation of these hydrogen-bonded networks under high RH and so enhance proton transport. A plausible proton conduction mechanism has been proposed as a result of modeling studies (FIGS. 11A, 12A-12B), carried out on a representative short chain of poly(TBL-DB18C6)-t. The structure of the repeating units of poly(TBL-DB18C6)-t was optimized using density functional theory (DFT) calculations. The optimized structure (FIGS. 11A, 12A-12B) results in a zig-zag pattern on account of the rigidity of the Tröger's base links. The formation of hydrogen-bonded networks—studied experimentally and computationally—in DB18C6 under hygroscopic conditions has been well-established. While keeping the geometry of every single layer rigid, the potential energy surface, as a function of inter-layer distance, was calculated for a double layer system (FIG. 11A) using a dispersion-corrected DFT method. The stacked form is observed to be more favorable energetically than the displaced form, with an optimal inter-layer distance of 5.2 Å in which the benzo rings of the crown ethers are located in ideal tn-t stacking geometries. In the case of poly(TBL-DB18C6)-c where cis-di(benzoamino)[18]crown-6 was used as a monomer, we observed a similar potential energy surface (FIG. 13), that is, the stacked form is observed to be more favorable energetically than a displaced form. We have demonstrated plausible pathways for proton conduction in the stacked form of the repeating units by inserting $H_2O$ molecules between the layers to represent the hygroscopic environment (FIGS. 11B-11C). We were able to obtain optimized structures with one or two $H_2O$ molecules forming hydrogen bonds with the oxygen atoms in the crown ether cavity and bridging adjacent layers to form proton conduction pathways with long-range order. We postulate—based on the observed proton conductivity and the modeling studies—that the proton conduction mechanism in poly(TBL-DB18C6)-t under humid conditions results from protons hopping through $H_2O$ molecules and [18]crown-6 cavities, i.e., by a Grotthuss mechanism.

Conclusions:

We have demonstrated how to integrate hydrophilic crown ethers into ladder-type polymer backbones and evaluated their proton conduction performance in humid environments. High molecular weight, robust, processable Tröger's base-linked polymers have been prepared by one-pot polymerizations of both constitutional isomers of di(aminobenzo)[18]crown-8 in the presence of a Lewis acid which acts as both a catalyst and a solvent. The characterization of the precursors—trans- or cis-di(nitrobenzo)[18]crown-8 and trans- or cis-di(aminobenzo) [18]crown-8—as well as the Tröger's base-linked polymers was carried out by FTIR, $^1H$ and $^{13}C$ NMR spectroscopy, and GPC analyses. Free-standing membranes obtained by solution casting of the Tröger's base-linked polymers, synthesized from both constitutional isomers, exhibit excellent thermal and water stabilities as a result of their high molecular mass. These Tröger's base-linked polymers have been shown to retain 23 wt % of water molecules at 25% RH. The adsorbed water molecules form hydrogen-bonded networks, which sustain long-range proton conductivity throughout the polymers. The proton conductivity of poly(TBL-DB18C6)-t and poly(TBL-DB18C6)-c, measured on a device with two terminal geometries in the presence of 5% of hydrogen, reveals a value of $1.4 \times 10^{-4}$ mS $cm^{-1}$ and $1.4 \times 10^{-1}$ mS $cm^{-1}$, respectively, in humid conditions at room temperature. Examination of a kinetic isotope effect—transport of $D^+$ ions— confirms that proton conductivity originates from the transport of protons rather than by ionic conduction in the polymers. Structural analyses, using DFT calculations, suggest that the short polymer chains of poly(TBL-DB18C6)-t, arranged in a stacked form with an inter-layer distance suitable for $H_2O$ molecules to form hydrogen-bonded networks, enable hopping of protons through these networks which are sustained by the oxygen atoms in the crown ether cavities. The addition of this new polymer to already existing proton exchange membranes for application in PEMFCs will make it possible for scientists and engineers to improve proton conductivities. In addition, the presence of crown ethers with a range of different cavity sizes in the Triger's base-linked polymers could lead to membrane-based small molecule separations.

Synthesis Schemes

Scheme 1. Synthesis of dinitro-derivatives of dibenzo[18]crown-6.

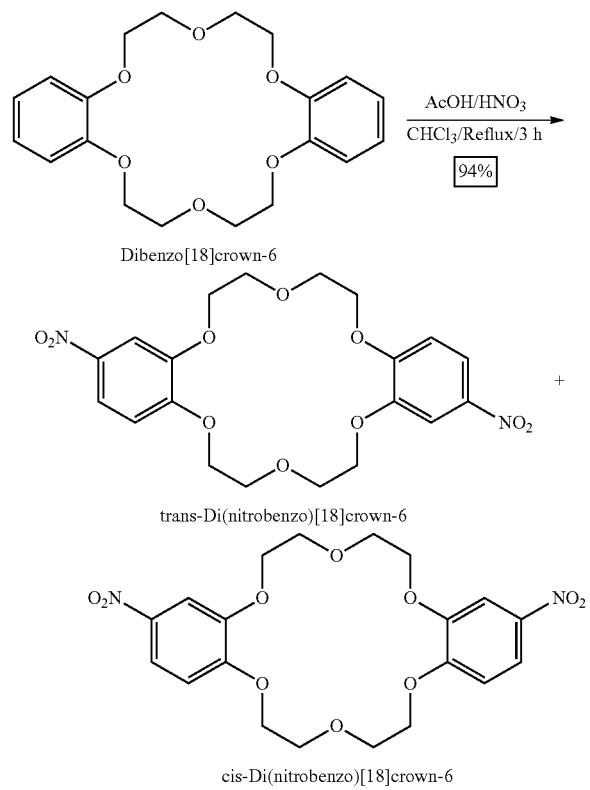

trans and cis-Di(nitrobenzo) [18] crown-6

The compounds trans-di(nitrobenzo)[18]crown-6 and cis-di(nitrobenzo)[18]crown-6—were prepared according to procedures already reported[3-5] in the literature. Dibenzo[18]crown-6 (10.38 g) was dissolved in CHCl₃ (208 mL). Acetic acid (156 mL) was added to the solution over 10 min and it was stirred at room temperature for 5 min. A solution of HNO₃ (7.2 mL) in acetic acid (20.8 mL) was added dropwise over 20 min and the solution was stirred for 1 h. The reaction mixture was heated under reflux for 3 h and cooled to room temperature. The precipitate which formed was filtered off, washed with CHCl₃ (2×25 mL), and the filtrate transferred to a conical flask. The residual acetic acid in the precipitate was washed using H₂O (3×25 mL) before drying it at 70° C. under vacuum for 24 h. The trans-di(nitrobenzo)[18]crown-6 was obtained as a pale yellow compound. The filtrate, which was left at room temperature for 48 h, resulted in the formation of a pale yellow crystalline compound, which was filtered, washed with CHCl₃ (2×25 mL) and H₂O (3×25 mL) to remove the residual acetic acid. The cis-di(nitrobenzo)[18]crown-6 was dried at 80° C. under vacuum for 24 h. Total recovery of the dinitro derivatives—trans-di(nitrobenzo) [18]crown-6 (46%, 4.7 g) and cis-di(nitrobenzo)[18]crown-6 (48%, 5 g)—was 94% (9.7 g). trans-Di(nitrobenzo)[18]crown-6: $^1$H NMR (500 MHz, CD₃SOCD₃) δ=7.89 (dd, J=9.0, 2.6 Hz, 2H), 7.73 (d, J=2.6 Hz, 2H), 7.16 (d, J=9.1 Hz, 2H), 4.22 (m, 8H), 3.90-3.83 (m, 8H). $^{13}$C NMR (125 MHz, CD₃SOCD₃) δ=153.7, 147.6, 140.2, 117.5, 111.2, 106.5, 68.4. cis-Di(nitrobenzo)[18]crown-6: $^1$H NMR (500 MHz, CD₃SOCD₃) δ=7.89 (dd, J=9.0, 2.6 Hz, 2H), 7.73 (d, J=2.6 Hz, 2H), 7.16 (d, J=9.0 Hz, 2H), 4.22 (m, 8H), 3.86 (m, 8H). $^{13}$C NMR (125 MHz, CD₃SOCD₃) δ=153.7, 147.6, 140.5, 117.5, 111.2, 106.5, 68.2.

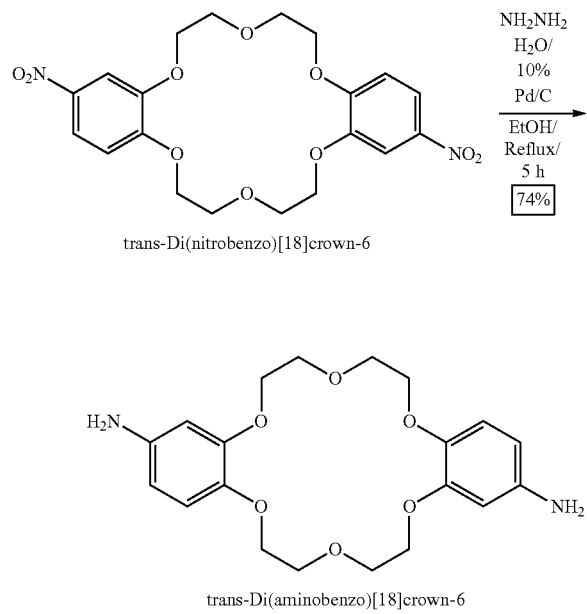

Scheme 2. Synthesis of diamino-derivatives of dibenzo[18]crown-6.

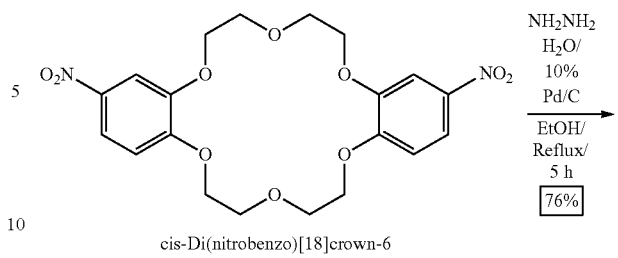

cis-Di(nitrobenzo)[18]crown-6

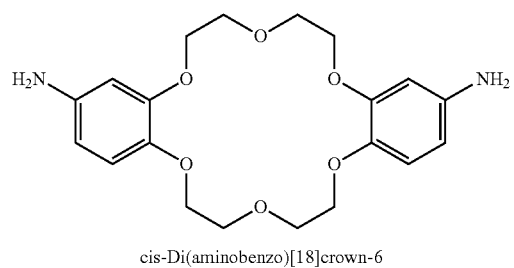

cis-Di(aminobenzo)[18]crown-6 trans and cis-Di(aminobenzo)[18]crown-6

The diamino derivative was prepared by the catalytic hydrogenation of the dinitro compound. trans-Di(nitrobenzo)[18]crown-6 (5 g) and 10% Pd/C (500 mg) were added in EtOH (170 mL). The reaction mixtures were stirred under N₂ atmosphere and heated under reflux as NH₂NH₂.H₂O (35 mL) was added over 20 min. The reaction was allowed to continue at 90° C. for 5 h to ensure complete removal of ammonia under an N₂ atmosphere. The hot reaction mixture was filtered in order avoid immediate crystallization of a product. The white crystalline compound—trans-di(aminobenzo)[18]crown-6—was washed using EtOH (3×5 mL) before drying it at 80° C. for 24 h under vacuum, resulted (3.7 g) in 74% yield. The similar procedure was also employed for the synthesis of trans-di(aminobenzo)[18]crown-6, in which cis-di(nitrobenzo)[18]crown-6 (2.75 g), 10% Pd/C (280 mg), EtOH (100 mL), and NH₂NH₂.H₂O (20 mL) were used. The trans-di(aminobenzo)[18]crown-6 was obtained (2.1 g) as a white crystalline material in 76% yield. trans-Di(aminobenzo)[18]crown-6: $^1$H NMR (500 MHz, CD₃SOCD₃) δ=6.62 (d, J=8.4 Hz, 2H), 6.23 (d, J=2.3 Hz, 2H), 6.05 (dd, J=8.4, 2.3 Hz, 2H), 4.63 (s, 4H), 4.04-3.87 (m, 8H), 3.86-3.71 (m, 8H). $^{13}$C NMR (125 MHz, CD₃SOCD₃) δ=149.2, 143.5, 139.1, 115.7, 105.3, 100.7, 71.5-65.8. cis-Di(aminobenzo)[18]crown-6: $^1$H NMR (500 MHz, CD₃SOCD₃) δ=6.62 (d, J=8.4 Hz, 2H), 6.24 (d, J=2.5 Hz, 2H), 6.05 (dd, J=8.4, 2.4 Hz, 2H), 4.63 (s, 4H), 4.06-3.87 (m, 8H), 3.86-3.71 (m, 8H). $^{13}$C NMR (125 MHz, CD₃SOCD₃) δ=149.2, 143.5, 139.1, 115.7, 105.3, 100.7, 71.5-65.8.

Scheme 3. Synthesis of Tröger's base linked poly(dibenzo[18]crown-6)s, Poly(TBL-DB18C6)-t and Poly(TBL-DB18C6)-c from trans and cis-di(aminobenzo)[18]crown-6, respectively.

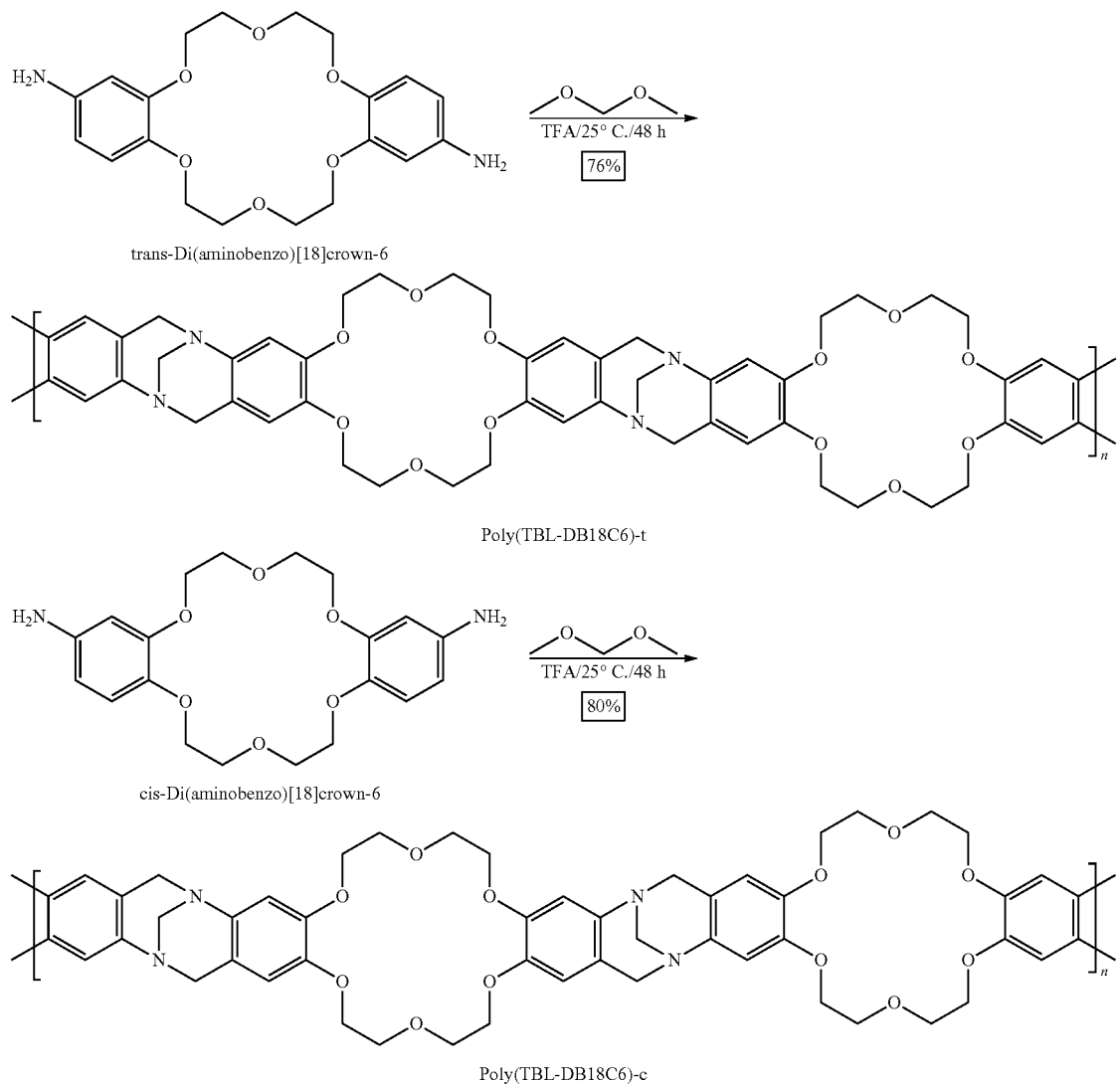

Poly(dibenzo[18]crown-6)s

In a two-neck flask placed in an ice bath, trans-di(aminobenzo)[18] crown-6 (1.2 g, 3.07 mmol) was added into dimethoxymethane (1.36 mL, 15.4 mmol) under an $N_2$ atmosphere. Trifluroacetic acid (12 mL) was added dropwise over 15 min with vigorously stirring for 30 min at 0° C. Subsequently, the solution was allowed to reach room temperature and stirred for 48 h. A viscous liquid obtained was added into aqueous $NH_4OH$ solution with stirring and it was allowed to stir for an additional 1 h, resulting in fibrous materials. The polymers were filtered off, soaked in $H_2O$ (3×100 mL), washed with MeOH, THF, and $Me_2CO$ (3×25 mL), and dried at 80° C. under vacuum for overnight to yield 1.27 g of poly(TBL-DB18C6)-t. The poly(TBL-DB18C6)-c was synthesized in accordance with above protocol, using cis-di(aminobenzo)[18]crown-6 (1.2 g, 3.07 mmol) as a monomer, resulting in 1.32 g of poly(TBL-DB18C6)-c. Poly(TBL-DB18C6)-t: $^1$H NMR (500 MHz, $CDCl_3$) δ=6.62, 6.35, 4.55, 4.23, 4.16-3.78. $^{13}$C NMR (125 MHz, $CDCl_3$) δ=148.3, 146.0, 141.2, 119.6, 111.6, 110.1, 71.0-68.1, 58.1. Poly(TBL-DB18C6)-c: $^1$H NMR (500 MHz, $CDCl_3$) δ=6.64, 6.35, 4.55, 4.24, 4.16-3.80. $^{13}$C NMR (125 MHz, $CDCl_3$) δ=148.3, 146.1, 141.1, 119.6, 111.5, 110.2, 70.5-68.5, 58.1.

Materials and Methods.

All chemicals and reagents were purchased from commercial suppliers (Sigma-Aldrich, TCI America or Fisher) and used without further purification.

Spectroscopy.

Fourier transform infrared (FTIR) spectra were recorded in attenuated total reflection (ATR) mode within the range 400-4000 cm$^{-1}$ using a Bruker Tensor 37 FTIR (MiD IR/ATR) spectrometer. Nuclear magnetic resonance (NMR) spectra were recorded on a Bruker Avance 600, with working frequencies of 500 MHz ($^1$H NMR) and 125 MHz ($^{13}$C NMR). Chemical shifts are reported in ppm relative to the signals corresponding to the residual non-deuterated solvents (($CD_3)_2SO$: δ 2.5 ppm; $CDCl_3$; δ 7.26 ppm).

Thermal Stability.

Thermogravimetric analysis (TGA) was conducted on polymers using a Mettler Toledo TGA/SDTA851e thermal analyzer. Polymers (3-5 mg) were loaded in an alumina pan and heated up to 800° C. at a rate of 10° C. min under the flow of $N_2$ gas (50 mL min$^{-1}$). The instrument was purged with $N_2$ gas for 1 h prior to examining samples and empty reference pan.

Average Molecular Weight.

The average molecular weight of the polymers was determined by Gel Permeation Chromatography (GPC). The analyses were carried out using a Wyatt technology GPC system which includes two PolyPore 300×7.5 mm columns (Varian p/n 5M-POLY-008-112) and detectors—MALS (18 Angles Dawn Heleos II), Viscometer (ViscoStar-II), and differential refractive index (OptiLab T-rex). Average molecular weights were determined from a calibration against polystyrene standards. Dilute solutions of polymers in $CHCl_3$ was used for the GPC analyses.

Water Vapor Adsorption.

A Hiden isochema intelligent gravimetric analyzer (IGA-200) was used to characterize the dynamic vapor sorption (DVS). The temperature of the sample and target vapor were controlled by two water baths equipped with an IGA-200. Data from both isotherms were collected using IGASwin software (v.1.06) which applies the buoyancy effect correction via a linear driving force model to every data point—i.e, each adsorbed mass recorded at a given vapor composition was determined by the difference between the mass gain at that point and that recorded with dry $N_2$— at 25° C. Vapor composition was modulated by mixing dry $N_2$ and the $N_2$ gas stream saturated with $H_2O$ vapor; $N_2$ carrier gas was bubbled through an $H_2O$ reservoir at 25° C. till saturation. The combined flow rate at any given concentration or relative pressure was 100 cm$^3$ min$^{-1}$. The time for each point of adsorption/desorption varies in accordance with reaching either an equilibrium or the time limit of 2 h.

Device Construction.

Devices consisted of 100 nm Pd contacts with a 5 nm Cr adhesion layer deposited on Si wafers with a 100 nm $SiO_2$ layer. Contact widths of either 600 or 200 µm, and distances between source and drain contacts ($Ls_D$) of 5, 10, 20, 50, 100, and 200 µm were defined. Polymers were dissolved in $CHCl_3$ (20 mg mL$^{-1}$) and spun onto devices at 500 rpm for 5 s prior to drying at 80° C. for 2 h.

Electrical Measurements.

Electronic recordings were carried out on an Agilent 4155C semiconductor parameter analyzer. Measurements were performed on a Signatone probe station fitted with a custom atmospheric isolation chamber using Dakota Instruments mass flow controllers.

Relative Humidity and Gas Composition.

Measurements in the chamber were carried out in an $N_2$ atmosphere which was varied between 50, 75, and 90% relative humidity. Proton current measurements were performed at 90% relative humidity with $H_2O$ and a mixture (95% $N_2$+5% $H_2$) of gases. Kinetic isotope effects were measured at 90% relative humidity with $D_2O$ and a mixture (95% $N_2$+5% $D_2$) of gases. All samples were incubated for a minimum of 1 h after switching to new atmospheric conditions.

Atomic Force Microscopy.

Film thickness and morphology were recorded with an Asylum MFP-3D Infinity AFM operating in AC Tapping Mode. Thickness measurements were carried out by removing a section of the film with a probe tip and looking at the height difference between the film top and exposed $SiO_2$. Morphology images of the channel were carried out between TLM contacts. All AFM measurements on the device were performed after electrical measurements at room temperature.

Simulation.

The computational studies on dibenzo[18]crown-6 in hygroscopic environment have been well-established. First, a single layer model was constructed by linking three units of dibenzo[18]crown-6 with two Tröger's base linkages. The geometry was then optimized using the B3LYP density functional with a 6-31G(d) basis set. Then, the potential energy surface as a function of inter-layer distance was calculated for the double layer system with the geometry of two fixed single layers using the B97D3 density functional which provides a reasonable description of the dispersion interactions at an affordable computational cost with a 6-31G(d) basis set. Finally, possible the proton conducting network models were constructed by inserting 1 or $2H_2O$ molecules between two layers of dibenzo[18]crown-6. The geometry was optimized with the two layers fixed at 5.2 Å distance (only $H_2O$ molecules were allowed to move) using B3LYP/6-31G(d,p), in which the enlarged basis set with diffuse functions and additional polarization functions on hydrogen was used to describe hydrogen-bonds. All calculations were performed using the Gaussian 09 (rev.D.01) software.[2]

REFERENCES

1. Bae, Y. S., and Snurr, R. Q. (2011). Development and evaluation of porous materials for carbon dioxide separation and capture. Angew. Chem. Int. Ed. 50, 11586-11596.
2. Patel, H. A., Byun, J., and Yavuz, C. T. (2017). Carbon dioxide capture adsorbents: Chemistry and methods. ChemSusChem 10, 1303-1317.
3. Trickett, C. A., Helal, A., Al-Maythalony, B. A., Yamani, Z. H., Cordova, K. E., and Yaghi, O. M. (2017). The chemistry of metal-organic frameworks for $CO_2$ capture, regeneration and conversion. Nat. Rev. Mater. 2, 17045.
4. Devanathan, R. (2008). Recent developments in proton exchange membranes for fuel cells. Energy Environ. Sci. 1, 101-119.
5. Scofield, M. E., Liu, H. Q., and Wong, S. S. (2015). A concise guide to sustainable PEMFCs: recent advances in improving both oxygen reduction catalysts and proton exchange membranes. Chem. Soc. Rev. 44, 5836-5860.
6. Shin, D. W., Guiver, M. D., and Lee, Y. M. (2017). Hydrocarbon-based polymer electrolyte membranes: Importance of morphology on ion transport and membrane stability. Chem. Rev. 117, 4759-4805.
7. Kraytsberg, A., and Ein-Eli, Y. (2014). Review of advanced materials for proton exchange membrane fuel cells. Energy Fuel 28, 7303-7330.
8. Mauritz, K. A., and Moore, R. B. (2004). State of understanding of Nafion. Chem. Rev. 104, 4535-4585.
9. Tripathi, B. P., and Shahi, V. K. (2011). Organic-inorganic nanocomposite polymer electrolyte membranes for fuel cell applications. Prog. Polym. Sci. 36, 945-979.
10. Wang, H., Zhu, Q., Zou, R., and Xu, Q. (2017). Metal-organic frameworks for energy applications. Chem 2, 52-80.
11. Zhang, H. W., and Shen, P. K. (2012). Recent development of polymer electrolyte membranes for fuel cells. Chem. Rev. 112, 2780-2832.

12. Yoon, M., Suh, K., Natarajan, S., and Kim, K. (2013). Proton conduction in metal-organic frameworks and related modularly built porous solids. Angew. Chem. Int. Ed. 52, 2688-2700.
13. Pedersen, C. J. (1967). Cyclic polyethers and their complexes with metal salts. J. Am. Chem. Soc. 89, 2495-2496.
14. Pedersen, C. J. (1967). Cyclic polyethers and their complexes with metal salts. J. Am. Chem. Soc. 89, 7017-7036.
15. Liu, Z., Nalluri, S. K. M., and Stoddart, J. F. (2017). Surveying macrocyclic chemistry: from flexible crown ethers to rigid cyclophanes. Chem. Soc. Rev. 46, 2459-2478.
16. Cram, D. J., and Cram, J. M. (1974). Host-guest chemistry. Science 183, 803-809.
17. Lehn, J. M. (1985). Supramolecular chemistry—receptors, catalysts, and carriers. Science 227, 849-856.
18. Gokel, G. W., Leevy, W. M., and Weber, M. E. (2004). Crown ethers: sensors for ions and molecular scaffolds for materials and biological models. Chem. Rev. 104, 2723-2750.
19. Buhl, M., Ludwig, R., Schurhammer, R., and Wipff, G. (2004). Hydronium ion complex of 18-crown-6: Theory confirms three "normal" linear hydrogen bonds. J. Phys. Chem. A 108, 11463-11468.
20. Kriz, J., Dybal, J., Makrlik, E., and Budka, J. (2008). Interaction of hydronium ion with dibenzo-18-crown-6: NMR, IR, and theoretical study. J. Phys. Chem. A 112, 10236-10243.
21. Kusaka, R., Inokuchi, Y., and Ebata, T. (2009). Water-mediated conformer optimization in benzo-18-crown-6-ether/water system. Phys. Chem. Chem. Phys. 11, 9132-9140.
22. Fukuhara, K., Tachikake, M., Matsumoto, S., and Matsuura, H. (1995). Raman spectroscopic study of the hydrates of 18-crown-6. J. Phys. Chem. A 99, 8617-8623.
23. Bühl, M., and Wipff, G. (2002). Hydronium ion complex of 18-crown-6: Where are the protons? A density functional study of static and dynamic properties. J. Am. Chem. Soc. 124, 4473-4480.
24. Fromm, K. M., and Bergougnant, R. D. (2007). Transport properties of solid state crown ether channel systems. Solid State Sci. 9, 580-587.
25. Bureekaew, S., Horike, S., Higuchi, M., Mizuno, M., Kawamura, T., Tanaka, D., Yanai, N., and Kitagawa, S. (2009). One-dimensional imidazole aggregate in aluminium porous coordination polymers with high proton conductivity. Nat. Mater. 8, 831-836.
26. Umeyama, D., Horike, S. Inukai, M., Itakura, T., and Kitagawa, S. (2012). Inherent proton conduction in a 2D coordination framework. J. Am. Chem. Soc. 134, 12780-12785
27. Hurd, J. A. Vaidhyanatha, R., Thangadura, V., Ratcliffe, C. I., Moudrakovski, I. L., and Shimizu, G. K. H. (2009). Anhydrous proton conduction at 150° C. in a crystalline metal-organic framework. Nat. Chem. 1, 705-710.
28. Cukierman, S. (2006). Et tu, Grotthuss! and other unfinished stories. Biochim. Biophys. Acta 1757, 876-885.
29. Kreuer, K. D. (2001). On the development of proton conducting polymer membranes for hydrogen and methanol fuel cells. J. Membr. Sci. 185, 29-39.
30. Hemmatian, Z., Keene, S., Josberger, E., Miyake, T., Arboleda, C., Soto-Rodriguez, J., Baneyx, F., and Rolandi, M. (2016). Electronic control of $H^+$ current in a bioprotonic device with Gramicidin A and Alamethicin. Nat. Commun. 7, 12981.
31. Didier, D., Tylleman, B., Lambert, N., Velde, C. M. L. V., Blockhuys, F., Collas, A., and Sergeyev, S. (2008). Functionalized analogues of Tröger's base: scope and limitations of a general synthetic procedure and facile, predictable method for the separation of enantiomers. Tetrahedron 64, 6252-6262.
32. Tröger, J. (1987). Ueber einige mittelst nascirenden formaldehydes entstehende basen. J. Prakt. Chem. 36, 225-245.
33. Carta, M., Malpass-Evans, R., Croad, M., Rogan, Y., Jansen, J. C., Bernardo, P., Bazzarelli, F., and McKeown, N. B. (2013). An efficient polymer molecular sieve for membrane gas separations. Science 339, 303-307.
34. Byun, J., Je, S. H., Patel, H. A., Coskun, A., and Yavuz, C. T. (2014). Nanoporous covalent organic polymers incorporating Tröger's base functionalities for enhanced $CO_2$ capture. J. Mater. Chem. A 2, 12507-12512.
35. Dolensky, B., Havlik, M., and Kral, V. (2012). Oligo Tröger's bases-new molecular scaffolds. Chem. Soc. Rev. 41, 3839-3858.
36. Dolensky, B., Valik, M., Sykora, D., and Kral, V. (2005). Synthetic routes to linear oligo-Tröger's bases. Org. Lett. 7, 67-70.
37. Hansson, A., Wixe, T., Bergquist, K. E., and Warnmark, K. (2005). A desymmetrization route to fused Troger's base analogues: Synthesis, isolation, and characterization of the first anti-anti diastereomer of a fused tris-Tröger's base analogue. Org. Lett. 7, 2019-2022.
38. Takeo, M. and Marco, R. (2016). Grotthuss mechanisms: From proton transport in proton wires to bioprotonic devices. J. Phys. Condens. Matter 28, 023001.
39. Patel, H. A., Mansor, N., Gadipelli, S., Brett, D. J. L., and Guo, Z. X. (2016). Superacidity in Nafion/MOF hybrid membranes retains water at low humidity to enhance proton conduction for fuel cells. ACS Appl. Mater. Inter. 8, 30687-30691.
40. Jeong, N. C., Samanta, B., Lee, C. Y., Farha, O. K., and Hupp, J. T. (2012). Coordination-chemistry control of proton conductivity in the iconic metal-organic framework material HKUST-1. J. Am. Chem. Soc. 134, 51-54.
41. Taylor, J. M., Mah, R. K. Moudrakovski, I. L. Ratcliffe, C. I. Vaidhyanathan, R., and Shimizu, G. K. H. (2010). Facile proton conduction via ordered water molecules in a phosphonate metal-organic framework. J. Am. Chem. Soc. 132, 14055-14057.
42. Josberger, E. E., Hassanzadeh, P., Deng, Y., Sohn, J., Rego, M. J., Amemiya, C. T., and Rolandi, M. (2016). Proton conductivity in ampullae of Lorenzini jelly. Sci. Adv. 2, e1600112.
43. Wiinsche, J., Deng, Y., Kumar, P., Di Mauro, E., Josberger, E., Sayago, J., Pezzella, A., Soavi, F., Cicoira, F., Rolandi, M., and Santato, C. (2015). Protonic and electronic transport in hydrated thin films of the pigment eumelanin. Chem. Mater. 27, 436-442.
44. Deng, Y., Josberger, E., Jin, J., Roudsari, A. F., Helms, B. A., Zhong, C., Anantram, M. P., and Rolandi, M. (2013). $H^+$-type and $OH^-$-type biological protonic semiconductors and complementary devices. Sci. Rep. 3, 2481.
45. Grimme, S., Ehrlich, S., and Goerigk, L. (2011). Effect of the damping function in dispersion corrected density functional theory. J. Comput. Chem. 32, 1456-1465.

We claim:

1. A composition comprising a double-strand chain, the double-strand chain comprising a plurality of constitutional units joined to each other through two atoms on one side of the constitutional unit and two atoms on the other side of the constitutional unit,
wherein each of the plurality of constitutional units comprise a dibenzo-crown ether macrocycle fused with a bicyclic aliphatic linker.

2. The composition of claim 1, wherein the bicyclic aliphatic linker comprises a diazocine linker having two bridgehead nitrogen atoms.

3. The composition of claim 2, wherein the diazocine linker comprises a [b,f][1,5]diazocine linker bridged by a methylene.

4. The composition of claim 1, wherein the dibenzo-crown ether macrocycle comprises a dibenzo[n]crown-m macrocycle and m=4, 5, 6, 7, or 8 and n=3 m.

5. The composition of claim 4, wherein m=6.

6. The composition of claim 1, wherein the chain is prepared from the cyclopolymerization of a plurality of di(aminobenzo)crown ethers.

7. The composition of claim 6, wherein the di(aminobenzo)crown ethers are selected from the group consisting of Formula IA

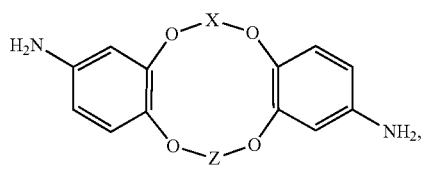

(IA)

and any combination thereof,
wherein X and Z are selected from the group consisting of alkyl and ether.

8. The composition of claim 7, wherein X and Y are independently selected from —CH$_2$CH$_2$—, —CH$_2$CH$_2$OCH$_2$CH$_2$—, or —CH$_2$CH$_2$OCH$_2$CH$_2$OCH$_2$CH$_2$—.

9. The composition of claim 8, wherein X and/or Y comprises —CH$_2$CH$_2$OCH$_2$CH$_2$—.

10. A polymer comprising the composition of claim 1.

11. The polymer of claim 10, wherein—
the polymer has a weight-average molecular weight ($M_w$) of at least 100,000 Da;
the polymer is thermally stable in an inert atmosphere up to a temperature of at least 200° C.;
the polymer is at least partially soluble in a halogenated alkane solvent;
the polymer has a water uptake capacity of at least 10 wt % at 90% relative humidity;
the polymer is capable of forming films; or
any combination thereof.

12. A membrane comprising the composition of claim 1.

13. The membrane of claim 12, wherein—
the membrane is proton conductive;
the membrane is capable of binding ions or small molecules;
the membrane is capable of separating gases;
the membrane is capable of treating water; or
any combination thereof.

14. A proton exchange membrane fuel cell comprising the membrane of claim 12.

15. A method for preparing a proton conductive membrane, the method comprising providing the composition of claim 1 and forming the membrane.

16. The method of claim 15 further comprising absorbing water onto the membrane.

17. The method of claim 15, wherein then the double strand chain is prepared from the cyclopolymerization of a plurality of di(aminobenzo)crown ethers.

18. The method of claim 17, wherein the di(aminobenzo) crown ethers are selected from the group consisting of Formula IA

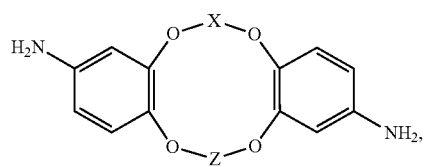

(IA)

Formula IB

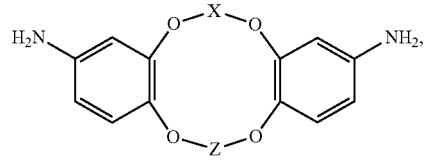

(IB)

and any combination thereof,
wherein X and Z are selected from the group consisting of alkyl and ether.

19. The method of claim 18, wherein X and Y are independently selected from —CH$_2$CH$_2$—, —CH$_2$CH$_2$OCH$_2$CH$_2$—, or —CH$_2$CH$_2$OCH$_2$CH$_2$OCH$_2$CH$_2$—.

20. The method of claim 19, wherein X and/or Y comprises —CH$_2$CH$_2$OCH$_2$CH$_2$—.

* * * * *